United States Patent
Yamazaki

(10) Patent No.: US 7,933,447 B2
(45) Date of Patent: Apr. 26, 2011

(54) IMAGE PROCESSING APPARATUS AND METHOD THEREOF

(75) Inventor: Taeko Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 986 days.

(21) Appl. No.: 11/468,351

(22) Filed: Aug. 30, 2006

(65) Prior Publication Data

US 2007/0047814 A1  Mar. 1, 2007

(30) Foreign Application Priority Data

Sep. 1, 2005  (JP) ................................. 2005-253793
Dec. 16, 2005 (JP) ................................. 2005-363864

(51) Int. Cl.
*G06K 9/34* (2006.01)
*G06K 9/46* (2006.01)
*G06K 9/66* (2006.01)
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)
*H04N 1/387* (2006.01)
*H04N 1/40* (2006.01)

(52) U.S. Cl. ........ 382/173; 382/190; 715/209; 715/246; 715/249; 358/453; 358/462

(58) Field of Classification Search .................. 382/173, 382/190
See application file for complete search history.

(56) References Cited

U.S. PATENT DOCUMENTS

| 6,453,079 | B1 * | 9/2002  | McInerny ...................... 382/311 |
| 6,768,816 | B2 * | 7/2004  | Hall, Jr. et al. ................ 382/229 |
| 7,519,221 | B1 * | 4/2009  | Nicholson ..................... 382/181 |
| 7,565,605 | B2 * | 7/2009  | Schohn et al. ................. 715/249 |
| 2001/0044797 | A1 | 11/2001 | Anward |
| 2002/0059265 | A1 * | 5/2002  | Valorose, III ................. 707/100 |
| 2004/0205568 | A1 * | 10/2004 | Breuel et al. .................. 715/513 |
| 2004/0218838 | A1 * | 11/2004 | Tojo et al. ..................... 382/305 |
| 2004/0230608 | A1 * | 11/2004 | Ornstein et al. ........... 707/104.1 |
| 2005/0154972 | A1 | 7/2005  | Bodin et al. |
| 2006/0288278 | A1 * | 12/2006 | Kobayashi ..................... 715/523 |
| 2007/0003139 | A1 * | 1/2007  | Gotoh et al. .................. 382/173 |

(Continued)

FOREIGN PATENT DOCUMENTS

JP  07-036860 A  2/1995

(Continued)

*Primary Examiner* — Samir A Ahmed
*Assistant Examiner* — Li Liu
(74) *Attorney, Agent, or Firm* — Cowan, Liebowitz & Latman, P.C.

(57) ABSTRACT

A document includes a region with a high character recognition ratio, and that with not so high a character recognition ratio. Hence, even when identical types of information are provided because they have the same attribute, it is hard to say that satisfactory information provision can be made. Also, different kinds of information are required depending on output methods. To solve these problems, output information to be output for each region is determined based on information of an output destination of a document image and attributes of respective regions in the document image, and pieces of output information to be output are combined to be output to the output destination. The output information to be output for each region may be determined based on the information of the output destination of the document image, the attributes of the respective regions in the document image, and user's authority information.

14 Claims, 27 Drawing Sheets

U.S. PATENT DOCUMENTS

2007/0189628 A1* 8/2007 Nolan et al. .................. 382/254
2007/0291289 A1* 12/2007 Kuo et al. ..................... 358/1.9

FOREIGN PATENT DOCUMENTS

| | | |
|---|---|---|
| JP | 08-204950 | 8/1996 |
| JP | 10-260983 | 9/1998 |
| JP | 2000-306103 | 11/2000 |
| JP | 2002-305651 A | 10/2002 |
| JP | 2003-348326 | 12/2003 |
| WO | WO 01/77847 | 10/2001 |
| WO | WO 2004-107214 | 12/2004 |

* cited by examiner

FIG. 3

| OUTPUT MODE | REGION ATTRIBUTE | | | | | |
|---|---|---|---|---|---|---|
| | PHOTO | TEXT (HIGH RECOGNITION RELIABILITY) | TEXT (LOW RECOGNITION RELIABILITY) | LINE ART | TABLE | BACKGROUND |
| COLOR PRINTING | COLOR RASTER | RASTER | RASTER | RASTER | RASTER | COLOR RASTER |
| COLOR PRINTING (HIGH IMAGE QUALITY) | HIGH-RESOLUTION COLOR RASTER | HIGH-RESOLUTION RASTER | HIGH-RESOLUTION RASTER | HIGH-RESOLUTION RASTER | HIGH-RESOLUTION RASTER | HIGH-RESOLUTION COLOR RASTER |
| MONOCHROME PRINTING | GRAYSCALE RASTER | RASTER | RASTER | RASTER | RASTER | GRAYSCALE RASTER |
| MONOCHROME PRINTING (HIGH IMAGE QUALITY) | HIGH-RESOLUTION RASTER | HIGH-RESOLUTION RASTER | HIGH-RESOLUTION RASTER | HIGH-RESOLUTION RASTER | HIGH-RESOLUTION RASTER | HIGH-RESOLUTION GRAYSCALE RASTER |
| MONITOR DISPLAY | LOW-RESOLUTION RASTER | TEXT | LOW-RESOLUTION RASTER | RASTER | LOW-RESOLUTION RASTER | LOW-RESOLUTION RASTER |
| PDA DISPLAY | LOW-RESOLUTION RASTER | TEXT | VECTOR | VECTOR | VECTOR | |
| ENLARGED DISPLAY | HIGH-RESOLUTION RASTER | VECTOR | VECTOR | VECTOR | VECTOR | HIGH-RESOLUTION RASTER |
| ULTRA ENLARGED DISPLAY | RASTER OF HIGHER RESOLUTION THAN ENLARGED MODE | | | | | RASTER OF HIGHER RESOLUTION THAN ENLARGED MODE |
| MODIFICATION | LOW-RESOLUTION RASTER | TEXT | TEXT | | | LOW-RESOLUTION RASTER |
| MANUAL | ** | ** | ** | ** | ** | ** |

FIG. 4

6-DAY TOUR TO SYDNEY, CANBERRA, AND MELBOURNE

TOUR TO VISIT SYDNEY, CANBERRA, AND MELBOURNE, THREE REPRESENTATIVE CITIES OF AUSTRALIA WHICH ESTABLISHED FEDERAL GOVERNMENT AND ATTAINED INDEPENDENCE FROM GREAT BRITAIN IN 1901.

| TOUR PRICES | ORDINARY | YEAR-END AND NEW YEAR |
|---|---|---|
| 6 DAYS | 158,000 | 178,000 |
| 8 DAYS | 185,000 | 205,000 |

CONTACT US : ○× TRAVEL CENTER 01-2345-6789 (△△)

FIG. 7

| EXISTING OUTPUT INFORMATION | TYPE OF OUTPUT INFORMATION (AFTER TRANSFORMATION) | | | | | | | |
|---|---|---|---|---|---|---|---|---|
| | HIGH-RESOLUTION COLOR RASTER | COLOR RASTER | LOW-RESOLUTION COLOR RASTER | HIGH-RESOLUTION MONOCHROME RASTER | MONOCHROME RASTER | LOW-RESOLUTION MONOCHROME RASTER | TEXT | VECTOR |
| HIGH-RESOLUTION COLOR RASTER | — | ○ | ○ | ○ | ○ | ○ | ○ | ○ |
| COLOR RASTER | × | — | ○ | × | ○ | ○ | ○ | ○ |
| LOW-RESOLUTION COLOR RASTER | × | × | — | × | × | ○ | ○ | ○ |
| HIGH-RESOLUTION MONOCHROME RASTER | × | × | × | — | ○ | ○ | ○ | ○ |
| MONOCHROME RASTER | × | × | × | × | — | ○ | ○ | ○ |
| LOW-RESOLUTION MONOCHROME RASTER | × | × | × | × | × | — | ○ | ○ |

FIG. 8

6-DAY TOUR TO SYDNEY, CANBERRA, AND MELBOURNE

TOUR TO VISIT SYDNEY, CANBERRA, AND MELBOURNE, THREE REPRESENTATIVE CITIES OF AUSTRALIA WHICH ESTABLISHED FEDERAL GOVERNMENT AND ATTAINED INDEPENDENCE FROM GREAT BRITAIN IN 1901.

| TOUR PRICES | ORDINARY | YEAR-END AND NEW YEAR |
|---|---|---|
| 6 DAYS | 158,000 | 178,000 |
| 8 DAYS | 185,000 | 205,000 |

CONTACT US : ○× TRAVEL CENTER 01-2345-6789 (△△)

FIG. 12
6-DAY TOUR TO SYDNEY, CANBERRA, AND MELBOURNE
TOUR TO VISIT SYDNEY, CANBERRA, AND MELBOURNE, THREE REPRESENTATIVE CITIES OF AUSTRALIA WHICH ESTABLISHED FEDERAL GOVERNMENT AND ATTAINED INDEPENDENCE FROM GREAT BRITAIN IN 1901.
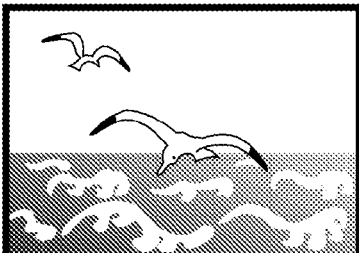
901
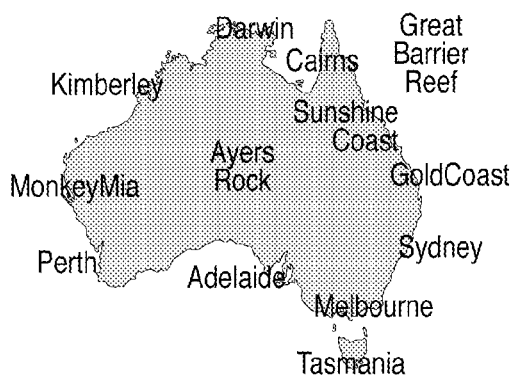
| TOUR PRICES | ORDINARY | YEAR-END AND NEW YEAR |
|---|---|---|
| 6 DAYS | 158,000 | 178,000 |
| 8 DAYS | 185,000 | 205,000 |
CONTACT US : ○× TRAVEL CENTER 01-2345-6789 (△△)

F I G. 14
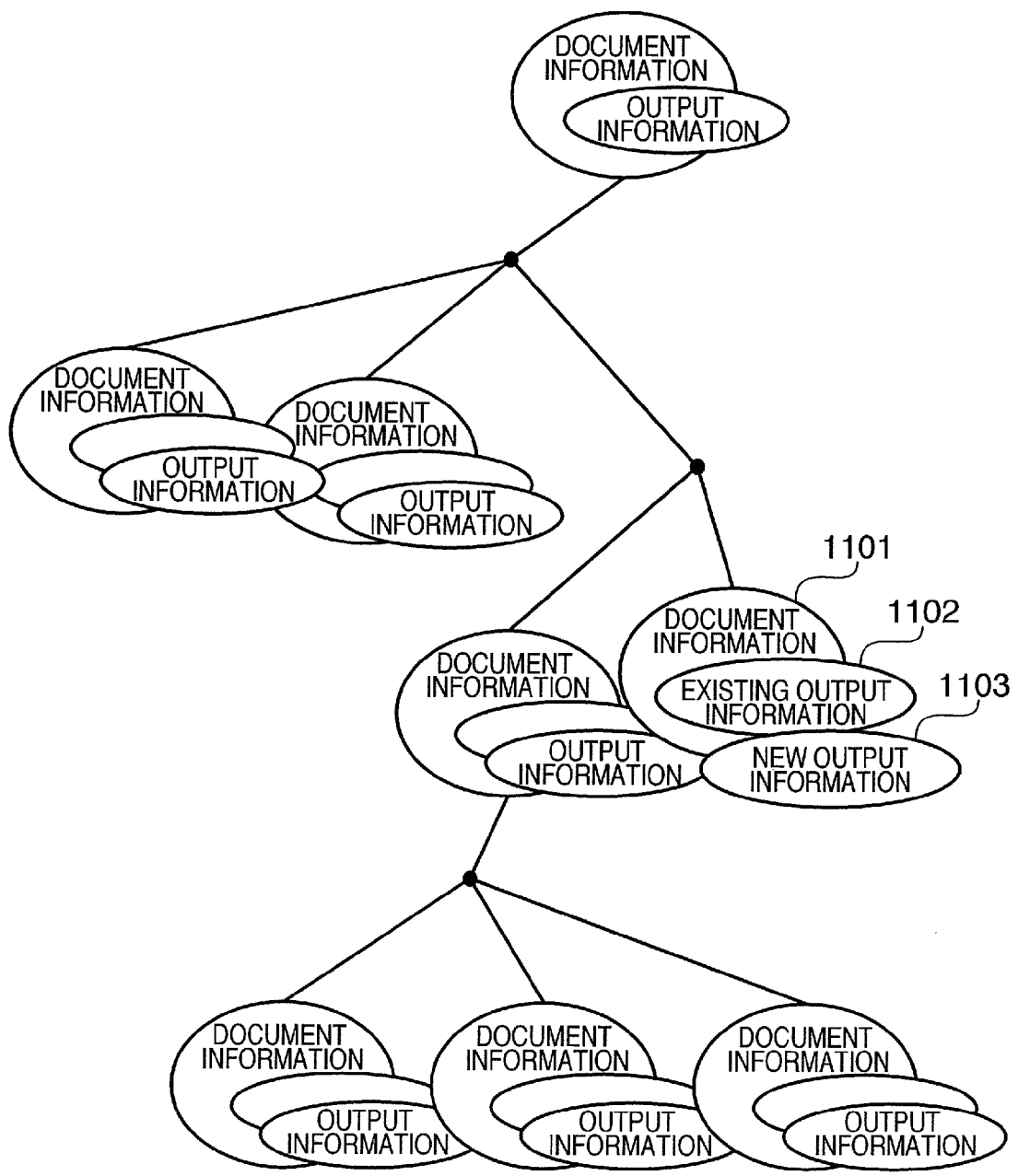

FIG. 16

| REGION | OUTPUT INFORMATION |
|---|---|
| TEXT REGION 301 (LOW RECOGNITION RATIO) | RASTER IMAGE, VECTOR IMAGE, AND TEXT OF CHARACTER RECOGNITION RESULT |
| PHOTO REGION 302 | COLOR RASTER IMAGE, GRAYSCALE RASTER IMAGE, MOSAIC-PROCESSED COLOR RASTER IMAGE, MOSAIC-PROCESSED GRAYSCALE RASTER IMAGE, COPYRIGHT-FREE COLOR RASTER IMAGE, AND COPYRIGHT-FREE GRAYSCALE RASTER IMAGE |
| TEXT REGION 303 (HIGH RECOGNITION RATIO) | RASTER IMAGE, VECTOR IMAGE, AND TEXT OF CHARACTER RECOGNITION RESULT |
| LINE ART REGION 304 | RASTER IMAGE, HIGH-RESOLUTION RASTER IMAGE, AND VECTOR IMAGE |
| TABLE REGION 305 | RASTER IMAGE, HIGH-RESOLUTION RASTER IMAGE, VECTOR IMAGE, AND TEXT OF CHARACTER RECOGNITION RESULT |
| TEXT REGION 306 (HIGH RECOGNITION RATIO) | RASTER IMAGE, VECTOR IMAGE, AND TEXT OF CHARACTER RECOGNITION RESULT |

FIG. 19A

| OUTPUT MODE | | USE AUTHORITY LEVEL | | |
|---|---|---|---|---|
| | | 1 | 2 | 3 |
| | COLOR PRINTING | ○ | ○ | × |
| | COLOR PRINTING (HIGH IMAGE QUALITY) | ○ | × | × |
| | MONOCHROME PRINTING | ○ | ○ | ○ |
| | MONOCHROME PRINTING (HIGH IMAGE QUALITY) | ○ | × | × |
| | MONITOR DISPLAY | ○ | ○ | ○ |
| | PDA DISPLAY | ○ | × | × |
| | ENLARGED DISPLAY | ○ | ○ | ○ |
| | ULTRA ENLARGED DISPLAY | ○ | ○ | × |
| | MODIFICATION | ○ | × | × |

FIG. 19B

| OUTPUT MODE | | USE AUTHORITY LEVEL | | |
|---|---|---|---|---|
| | | 1 | 2 | 3 |
| | COLOR PRINTING | ○ | ○ | ○ |
| | COLOR PRINTING (HIGH IMAGE QUALITY) | ○ | × | × |
| | MONOCHROME PRINTING | ○ | ○ | ○ |
| | MONOCHROME PRINTING (HIGH IMAGE QUALITY) | ○ | ○ | ○ |
| | MONITOR DISPLAY | ○ | ○ | ○ |
| | PDA DISPLAY | ○ | × | × |
| | ENLARGED DISPLAY | ○ | ○ | ○ |
| | ULTRA ENLARGED DISPLAY | ○ | ○ | × |
| | MODIFICATION | ○ | × | × |

|  | USE AUTHORITY LEVEL | | |
|---|---|---|---|
|  | 1 | 2 | 3 |
| USE PERMISSION | ○ | × | × |

F I G. 20A

|  | USE AUTHORITY LEVEL | | |
|---|---|---|---|
|  | 1 | 2 | 3 |
| USE PERMISSION | × | ○ | × |

F I G. 20B

|  | USE AUTHORITY LEVEL | | |
|---|---|---|---|
|  | 1 | 2 | 3 |
| USE PERMISSION | × | × | ○ |

F I G. 20C

|  | USE AUTHORITY LEVEL | | |
|---|---|---|---|
|  | 1 | 2 | 3 |
| USE PERMISSION | ○ | ○ | ○ |

F I G. 20D

FIG. 22A
6-DAY TOUR TO SYDNEY, CANBERRA, AND MELBOURNE
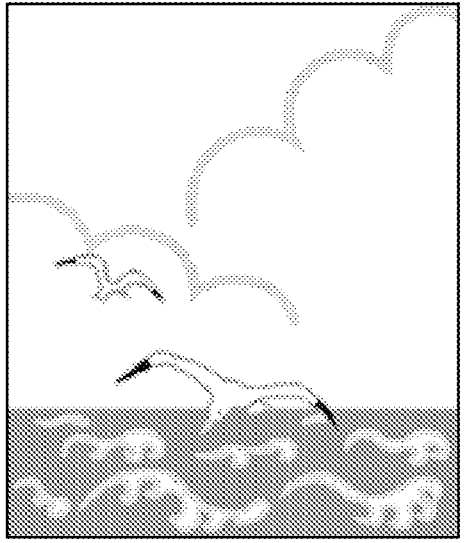
TOUR TO VISIT SYDNEY, CANBERRA, AND MELBOURNE, THREE REPRESENTATIVE CITIES OF AUSTRALIA WHICH ESTABLISHED FEDERAL GOVERNMENT AND ATTAINED INDEPENDENCE FROM GREAT BRITAIN IN 1901.
| TOUR PRICES | ORDINARY | YEAR-END AND NEW YEAR |
|---|---|---|
| 6 DAYS | 158,000 | 178,000 |
| 8 DAYS | 185,000 | 205,000 |
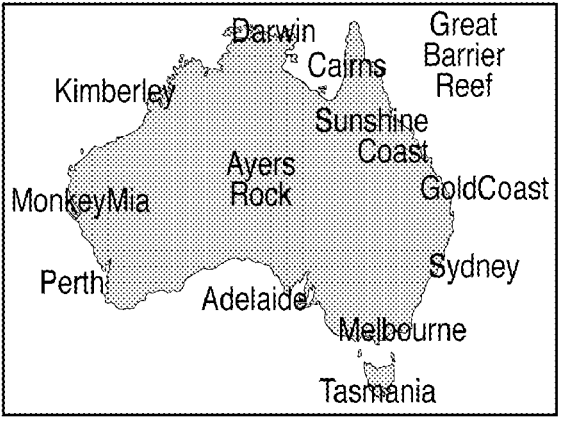
CONTACT US : ○× TRAVEL CENTER 01-2345-6789 (△△)

FIG. 22B
6-DAY TOUR TO SYDNEY, CANBERRA, AND MELBOURNE
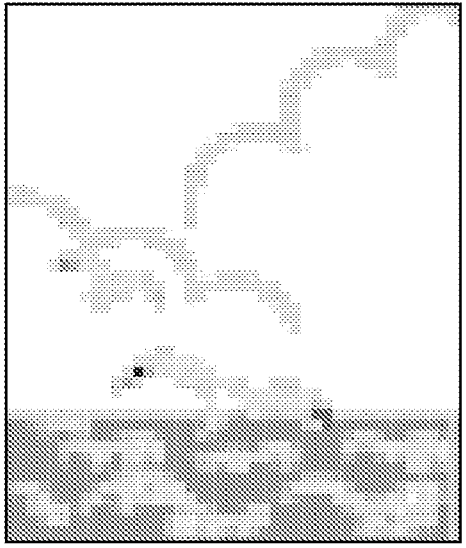
TOUR TO VISIT SYDNEY, CANBERRA, AND MELBOURNE, THREE REPRESENTATIVE CITIES OF AUSTRALIA WHICH ESTABLISHED FEDERAL GOVERNMENT AND ATTAINED INDEPENDENCE FROM GREAT BRITAIN IN 1901.
| TOUR PRICES | ORDINARY | YEAR-END AND NEW YEAR |
|---|---|---|
| 6 DAYS | 158,000 | 178,000 |
| 8 DAYS | 185,000 | 205,000 |
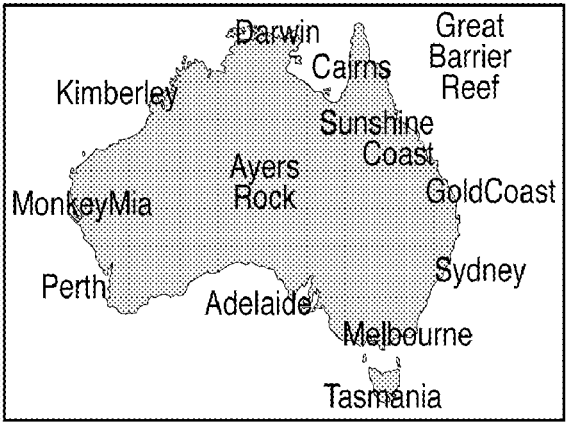
CONTACT US : ○× TRAVEL CENTER 01-2345-6789 (△△)

FIG. 22C
6-DAY TOUR TO SYDNEY, CANBERRA, AND MELBOURNE
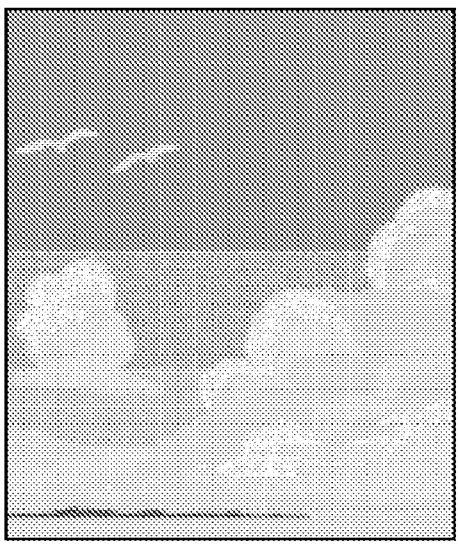
TOUR TO VISIT SYDNEY, CANBERRA, AND MELBOURNE, THREE REPRESENTATIVE CITIES OF AUSTRALIA WHICH ESTABLISHED FEDERAL GOVERNMENT AND ATTAINED INDEPENDENCE FROM GREAT BRITAIN IN 1901.
| TOUR PRICES | ORDINARY | YEAR-END AND NEW YEAR |
|---|---|---|
| 6 DAYS | 158,000 | 178,000 |
| 8 DAYS | 185,000 | 205,000 |
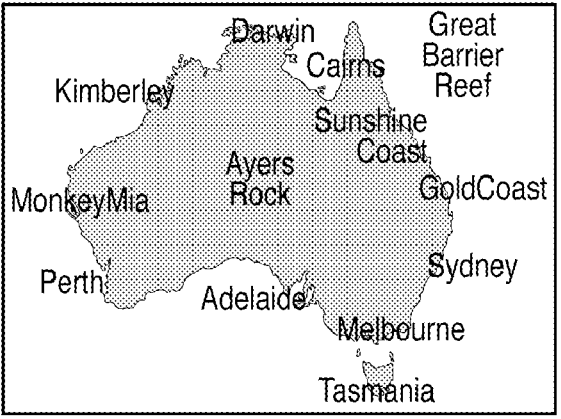
CONTACT US : ○× TRAVEL CENTER 01-2345-6789 (△△)

FIG. 22D

6-DAY TOUR TO SYDNEY, CANBERRA, AND MELBOURNE

TOUR TO VISIT SYDNEY, CANBERRA, AND MELBOURNE, THREE REPRESENTATIVE CITIES OF AUSTRALIA WHICH ESTABLISHED FEDERAL GOVERNMENT AND ATTAINED INDEPENDENCE FROM GREAT BRITAIN IN 1901.

| TOUR PRICES | ORDINARY | YEAR-END AND NEW YEAR |
|---|---|---|
| 6 DAYS | 158,000 | 178,000 |
| 8 DAYS | 185,000 | 205,000 |

CONTACT US : ○× TRAVEL CENTER 01-2345-6789 (△△)

FIG. 23A

| | | USE AUTHORITY LEVEL | | |
|---|---|---|---|---|
| | | 1 | 2 | 3 |
| OUTPUT MODE | COLOR PRINTING | ○ | ○ | × |
| | COLOR PRINTING (HIGH IMAGE QUALITY) | ○ | × | × |
| | MONOCHROME PRINTING | ○ | ○ | ○ |
| | MONOCHROME PRINTING (HIGH IMAGE QUALITY) | ○ | × | × |
| | MONITOR DISPLAY | ○ | ○ | ○ |
| | PDA DISPLAY | ○ | × | ○ |
| | ENLARGED DISPLAY | ○ | ○ | × |
| | ULTRA ENLARGED DISPLAY | ○ | × | × |
| | MODIFICATION | ○ | ○ | × |
| | TRANSFORMATION | ○ | × | × |
| | RETRIEVAL | ○ | × | × |

FIG. 23B

| | | USE AUTHORITY LEVEL | | |
|---|---|---|---|---|
| | | 1 | 2 | 3 |
| OUTPUT MODE | COLOR PRINTING | ○ | ○ | ○ |
| | COLOR PRINTING (HIGH IMAGE QUALITY) | ○ | × | × |
| | MONOCHROME PRINTING | ○ | ○ | ○ |
| | MONOCHROME PRINTING (HIGH IMAGE QUALITY) | ○ | ○ | ○ |
| | MONITOR DISPLAY | ○ | ○ | ○ |
| | PDA DISPLAY | ○ | × | × |
| | ENLARGED DISPLAY | ○ | ○ | ○ |
| | ULTRA ENLARGED DISPLAY | ○ | ○ | × |
| | MODIFICATION | ○ | × | × |
| | TRANSFORMATION | ○ | ○ | ○ |
| | RETRIEVAL | ○ | × | × |

IMAGE PROCESSING APPARATUS AND METHOD THEREOF

BACKGROUND OF THE INVENTION

1. Field of the Invention

The present invention relates to an image processing apparatus and method thereof, which allow usage, modification, display, movement, sharing, and the like of document images.

2. Description of the Related Art

Multi-functional peripheral equipments (MFPs) have gained remarkably advanced functions, and those which have scanner and facsimile functions in addition to copy and print function have become the mainstream in the market. An MFP in an office has an important role as an interface between information printed on paper sheets and digital data.

Especially, the scanner function of the MFP can efficiently transform a volume of documents into digital data. For this reason, documents are scanned and are saved in a database (DB) on a network or of the MFP itself, and undergo document management in many cases. Digital data obtained by scanning a document will be referred to as a "document image" hereinafter.

Along with the popularization of personal computers (PCs), document creation using application software on such PC is common. A document in a digital data state created by the application software will be referred to as a "digital document" hereinafter.

Document images and digital documents have advantages of easy re-editing and re-use of data, easy sharing of data by the large number of persons, no deterioration along with the elapse of time, and the like compared to documents printed on paper sheets. On the other hand, documents printed on paper sheets have advantages of high readability, easy handling, high portability, high understandability, and the like compared to the document images and digital documents. For this reason, in many examples, it is often efficient to print digital documents and document images on paper sheets.

Conversely, document images and digital documents which are the same as or similar to documents printed on paper sheets are often required. For example, the user damages some document pages printed on paper sheets and wants to print the digital document in the initial state. Also, the user wants to re-print a digital document in color, which is originally a color document but was printed as a monochrome document.

There may be many situations in which a photo, text, table, and line art included together in a document image are respectively analyzed, and the analysis results are to be re-used. For example, data transformation based on character recognition when a document image is used as text data, transformation into a vector image free from any deterioration of image quality if a specific region is enlarged to be easy to see, and the like are made in such situations.

In this way, a document management system which has documents printed on paper sheets as a start point and allows the user to easily make use, modify, display, move, share, and like of data is demanded.

When a document image generated by scanning a document that includes a photo and text together is re-printed, for example, an A4-size, JPEG-compressed color scan image of 300 dpi has a data size close to 3.5 MB, and if the large number of document images flow on the network, the load on the network becomes heavy. However, when the resolution is decreased, the image quality of a text region deteriorates.

Hence, uniform image processing to be applied to one page of a document image has a limitation, and the following prior arts have been proposed.

Japanese Patent Laid-Open No. 8-204950 discloses image management which segments an input image into a photo region and text region, and sets the resolutions of the photo region and text region to be variable. However, only a raster image has a variable resolution, and a vector image and the character recognition result of the text region are not managed. Japanese Patent Laid-Open No. 2003-348326 discloses a technique for segmenting a document image for respective lines, and re-combining the segmented lines so as to display a scan image on a portable terminal (PDA). However, the output destination is limited to the portable terminal, an object to be processed is only a raster image, and a vector image and character recognition result are not supported.

Japanese Patent Laid-Open No. 2000-306103 discloses a technique for segmenting a document image into a text region, image region, and background region, distributing these regions to layers prepared in advance to greatly reduce the data size of the document image, and holding document data in a format that allows easy re-use of data. Even in document data in a format that allows easy re-use, information of each region is only one type.

A feature common to these prior arts is that images are managed for respective attributes of regions. However, even regions with an identical attribute have various natures. For example, given two different text regions in a single document image, one region may have a high character recognition ratio, but the other region may have not so high a recognition ratio. In this way, even when identical types of information are provided because they have the same attribute, it is hard to say that satisfactory information provision can be made.

These prior arts execute processing such as resolution transformation and the like in a limited way upon data registration, and do not support processing for transforming into a resolution that the user wants upon outputting.

Under the present circumstances, when the user wants to re-print, as a color document, a digital document which is originally a color digital document and was printed as a monochrome document, or when the user wants to acquire a digital document of an original copy based on a document printed on paper sheets, he or she normally inquires a person who created an original digital document to acquire a required digital document.

A wide variety of apparatuses such as printers, monitors, PDAs, and the like are used to output document images, and the output contents may often be a full or partial document image. Furthermore, data which can be modified is often required, and various types of information are required for a document image.

However, in Japanese Patent Laid-Open No. 8-204950, only a raster image can have a variable resolution. A vector image, the character recognition result of a text region, and the like are not managed. Also, in Japanese Patent Laid-Open No. 2003-348326, its output destination is limited to the PDA, the object to be modified is only a raster image, and a vector image and character recognition result are not supported.

There may be many situations in which a photo, text, table, and line art included together on a document are respectively analyzed, and a document is to be output by applying image processing in correspondence with the attributes of objects. The technique in Japanese Patent Laid-Open No. 2000-306103 holds a document image in a format that allows easy re-use, as described above. However, only one type of information of each region is output to another apparatus or application.

These regions manage images for respective attributes of regions. However, as described above, regions have various natures although they have an identical attribute. Even when identical types of information are provided because they have an identical attribute, information cannot often be satisfactorily transferred.

Furthermore, for respective objects of a document, a document cannot be output by replacing data formats or data themselves depending on the output mode of the document, the contents of objects, and the like.

SUMMARY OF THE INVENTION

The first aspect of the present invention discloses an image processing method comprising the steps of: obtaining information of an output destination of a document image stored in a memory; determining types of output information to be output for respective regions based on the information of the output destination and attributes of the respective regions in the document image; obtaining pieces of output information of the types to be output for the respective regions; combining the pieces of output information obtained for the respective regions into a document image; and outputting the combined document image to the output destination.

The second aspect of the present invention discloses an image processing apparatus comprising: a first obtainer, arranged to obtain information of an output destination of a document image stored in a memory; a determiner, arranged to determine types of output information to be output for respective regions based on the information of the output destination and attributes of the respective regions in the document image; a second obtainer, arranged to obtain pieces of output information of the types to be output for the respective regions; a combiner, arranged to combine the pieces of output information obtained for the respective regions into a document image; and an output unit, arranged to output the combined document image to the output destination.

According to the present invention, upon outputting output information of each region of a document image, the output information of a type according to its output destination can be output.

Further features of the present invention will become apparent from the following description of exemplary embodiments with reference to the attached drawings.

BRIEF DESCRIPTION OF THE DRAWINGS

FIG. 3 is a table showing the relationship between output modes and output information selected depending on region attributes;

FIG. 4 shows an example of a color document image;

FIG. 7 shows the types of output information which can be transformed from existing types of output information;

FIG. 8 shows an example of a digital image of a document obtained by monochrome-copying a color document;

FIG. 12 shows an example of an enlarged region;

FIG. 14 is a view illustrating information which associates document information with output information of each segmented region;

FIG. 16 is a table showing an example of output information generated from the document image shown in FIG. 4;

FIGS. 19A and 19B are table examples showing output mode-dependent use authorities;

FIGS. 20A to 20D are table examples showing content-dependent use authorities;

FIGS. 22A to 22D show output examples of registered data corresponding to the document image shown in FIG. 4;

FIGS. 23A and 23B are tables showing output mode-dependent use authorities to be set for the document image shown in FIG. 4 according to the third embodiment.

DESCRIPTION OF THE EMBODIMENTS

An image processing apparatus and method thereof according to preferred embodiments of the present invention will be described in detail hereinafter with reference to the accompanying drawings.

First Embodiment

[Arrangement of Apparatus]

Figure 1:
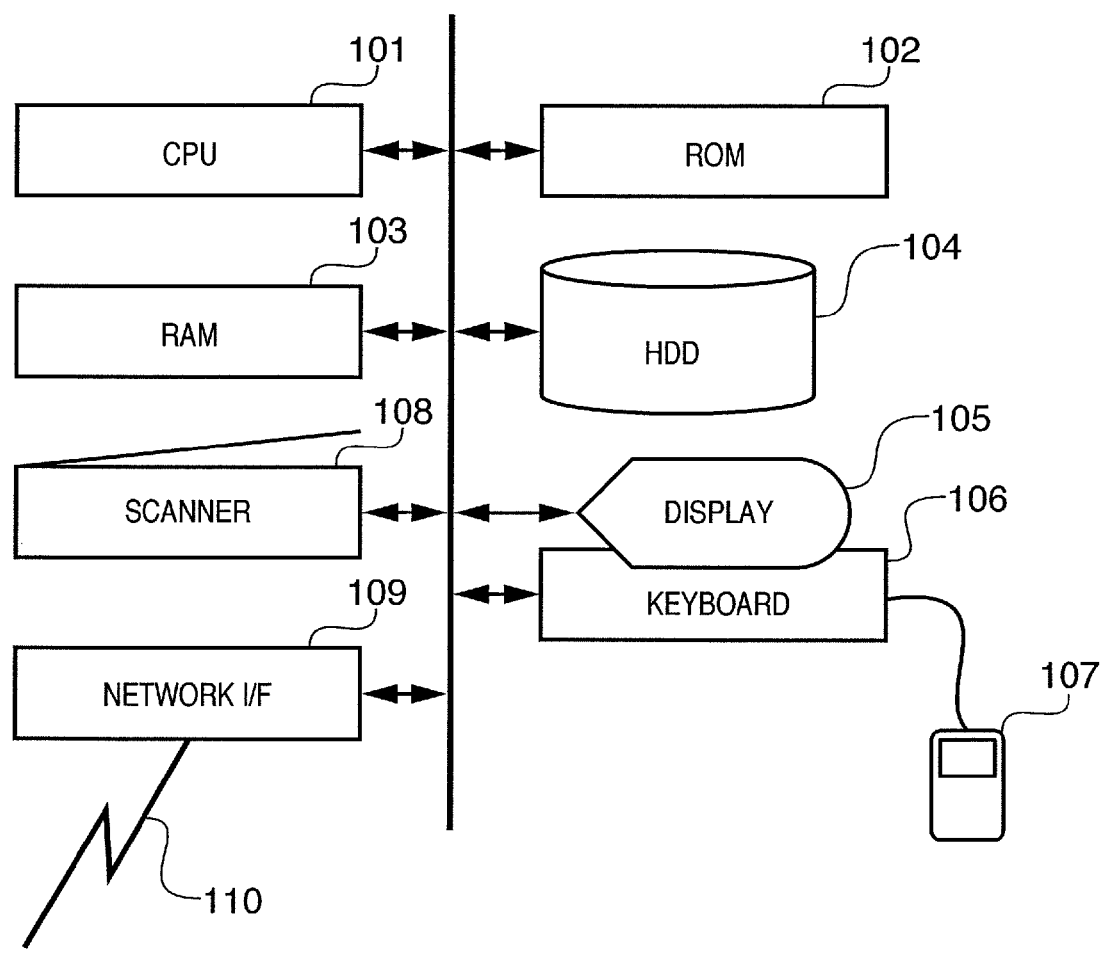
FIG. 1 is a block diagram showing the arrangement of an image processing apparatus.

FIG. 1 is a block diagram showing the arrangement of an image processing apparatus according to this embodiment.

A CPU 101 controls the overall apparatus using a RAM 103 as a work memory in accordance with control programs stored in a ROM 102. The ROM 102 stores control programs and the like (to be described later) to be executed by the CPU 101. The RAM 103 and an HDD 104 such as a magnetic disk or the like store processing programs, document images, and the like (to be described later).

A scanner 108 is connected to the image processing apparatus via a general-purpose interface (e.g., USB or IEEE1394: not shown). The scanner 108 scans an image of a document (original) printed on a paper sheet and outputs a document image under the control of the CPU 101. The CPU 101 displays a user interface on a display 105, and inputs user's instructions from a keyboard 106 or a pointing device 107 such as a mouse or the like, which are connected via, e.g., an interface such as USB or the like.

The image processing apparatus is connected to a network 110 such as a local area network or the like via a network interface (I/F) 109. The image processing apparatus communicates with other apparatus (servers, computers, printers, scanners, MFPs, and the like) on the network to exchange data and programs.

The image processing apparatus can also be implemented by a general-purpose computer. In such case, the image processing apparatus stores control programs and processing programs provided via the network 110 or storage media in the HDD 104. Then, these programs can be executed by the CPU 101 according to instructions of the user and the like.

[Registration Processing]

Figure 2:
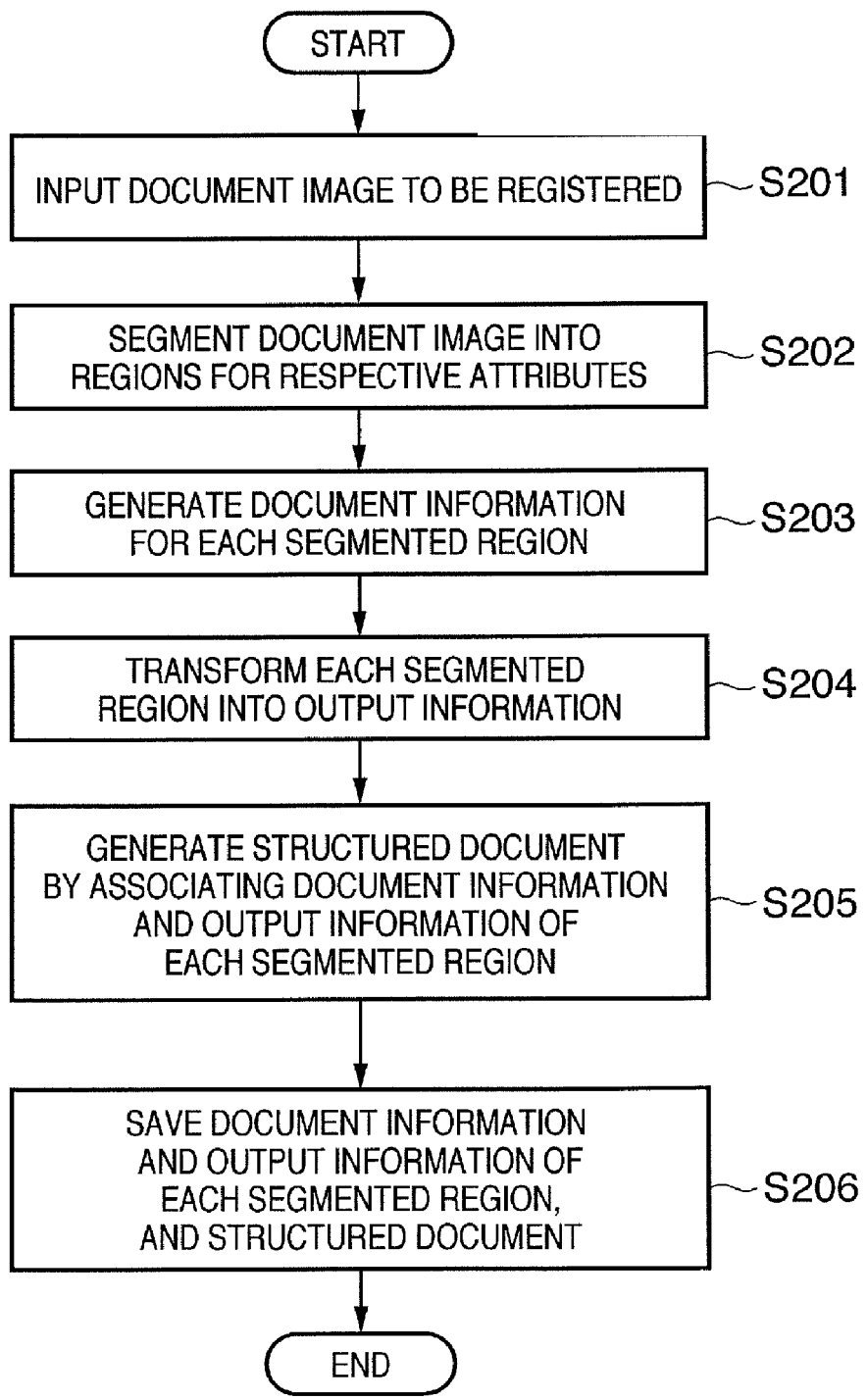
FIG. 2 is a flowchart showing processing for registering data in the image processing apparatus.

FIG. 2 is a flowchart showing processing for registering data in the image processing apparatus. This processing is executed by the CPU 101 based on instructions of the user and the like.

A document image to be registered is input from the scanner 108 or network 110 (S201), and is segmented into regions having attributes such as text, photo, table, line art, and the like (S202). Document information is generated for each segmented region (S203). The document information includes attribute information of the region of interest, layout information indicating position coordinates and the like on a page, region information, and the like. Note that the region information includes a character code string, a document logical structure such as paragraphs, a title, and the like, and so forth in case of a segmented region of a text attribute.

Next, each segmented region is transformed into output information (S204). In this embodiment, information to be output (information to be transferred) to another apparatus, another application, or the like will be referred to as output information. The output information is information required for rendering, and includes, e.g., the following information: a resolution-variable raster image, vector image, monochrome image, or color image, the file size of each output information, text as a character recognition result, the positions and font name or type of individual characters, the reliability of character recognition, and the like in case of the segmented region with a text attribute.

Upon outputting output information, the following output modes are prepared in consideration of the features of attributes of regions and the use conditions of the user: nine patterns of output modes including color printing, color printing (high image quality), monochrome printing, monochrome printing (high image quality), monitor display, PDA display, enlarged display, ultra enlarged display, and modification, and a manual output mode set by the user.

FIG. 3 shows the relationship between the 10 patterns of output modes and the output information to be selected based on region attributes. This relationship is stored in, e.g., the HDD 104 or the like as a table.

All of the above modes need not be prepared as output information of each region, and modes which are expected to be used frequently may be prepared. In this case, a memory that stores output information can be saved. For example, in FIG. 3, output information for a combination "PDA display—background" which may have a very low frequency of use is not prepared as a default. Likewise, output information for each of combinations "ultra enlarged display—text (high recognition reliability)", "ultra enlarged display—text (low recognition reliability)", and "ultra enlarged display—line art" is not prepared as a default. Furthermore, the relationship between region attributes and output information in the manual output mode is set by the user using the user interface, keyboard 106, and pointing device 107.

In the following description, monochrome printing and monitor display are used as basic output modes (called basic patterns), and other output modes (called applied patterns) have a lower frequency of use than the basic patterns. Therefore, a case will be explained wherein only output information for each of the basic patterns is prepared as follows.

|  | Monochrome Printing | Monitor Display |
| --- | --- | --- |
| Text region | Raster image | Raster image |
| Photo region | Grayscale raster image | Low-resolution raster image |
| Line art region | Raster image | Raster image |
| Table region | Raster image | Low-resolution raster image |

Next, a structured document which associates document information and output information of respective segmented regions and is described in a tree structure is generated (S205). Finally, the generated data group (document information and output information of the respective segmented regions and the structured document) is saved (registered) in the HDD 104 or the like (S206). Note that the save destination of the data group may be a server on the network 110.

A case will be explained below wherein the aforementioned registration processing is applied to a color document image shown in FIG. 4.

Sets of black pixel clusters and white pixel clusters are extracted from the document image shown in FIG. 4, and regions with attributes such as text, photo, drawing, table, frame, and line art are extracted based on feature amounts such as their shapes, sizes, set states, and the like. In the example shown in FIG. 4, regions 301, 303, and 306 with a text attribute, a region 302 with a color photo attribute, a region 304 with a drawing attribute, and a region 305 with a table attribute are segmented. Assume that the segmented region 301 of a logotype has low reliability of a character recognition result since it has a character mode different from general fonts. Also, characters in the segmented region 306 are considerably smaller than those in the segmented region 303.

Figure 5:
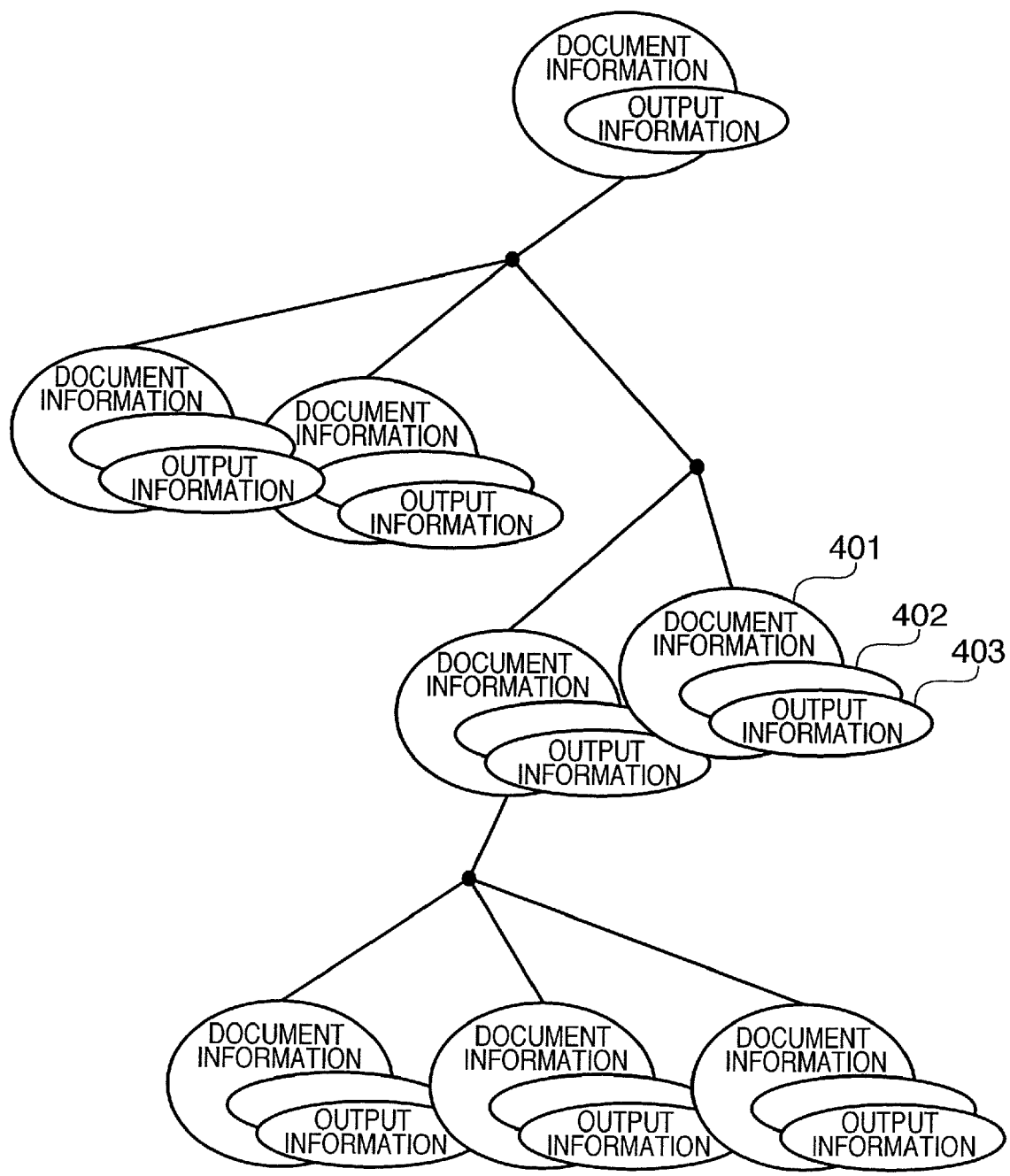
FIG. 5 is a view illustrating information which associates document information with output information of each segmented region.

FIG. 5 is a view illustrating information which associates document information with output information of each segmented region.

That is, document information 401 of a given segmented region holds two pieces of output information 402 and 403 of that region obtained in step S204. This tree structure can hierarchically express the relationship among respective segmented regions. Note that the document information can hold a plurality of types of output information.

These pieces of associated information are generated and saved in the format of a structured document represented by XML.

[Output of Output Information]

Figure 6:
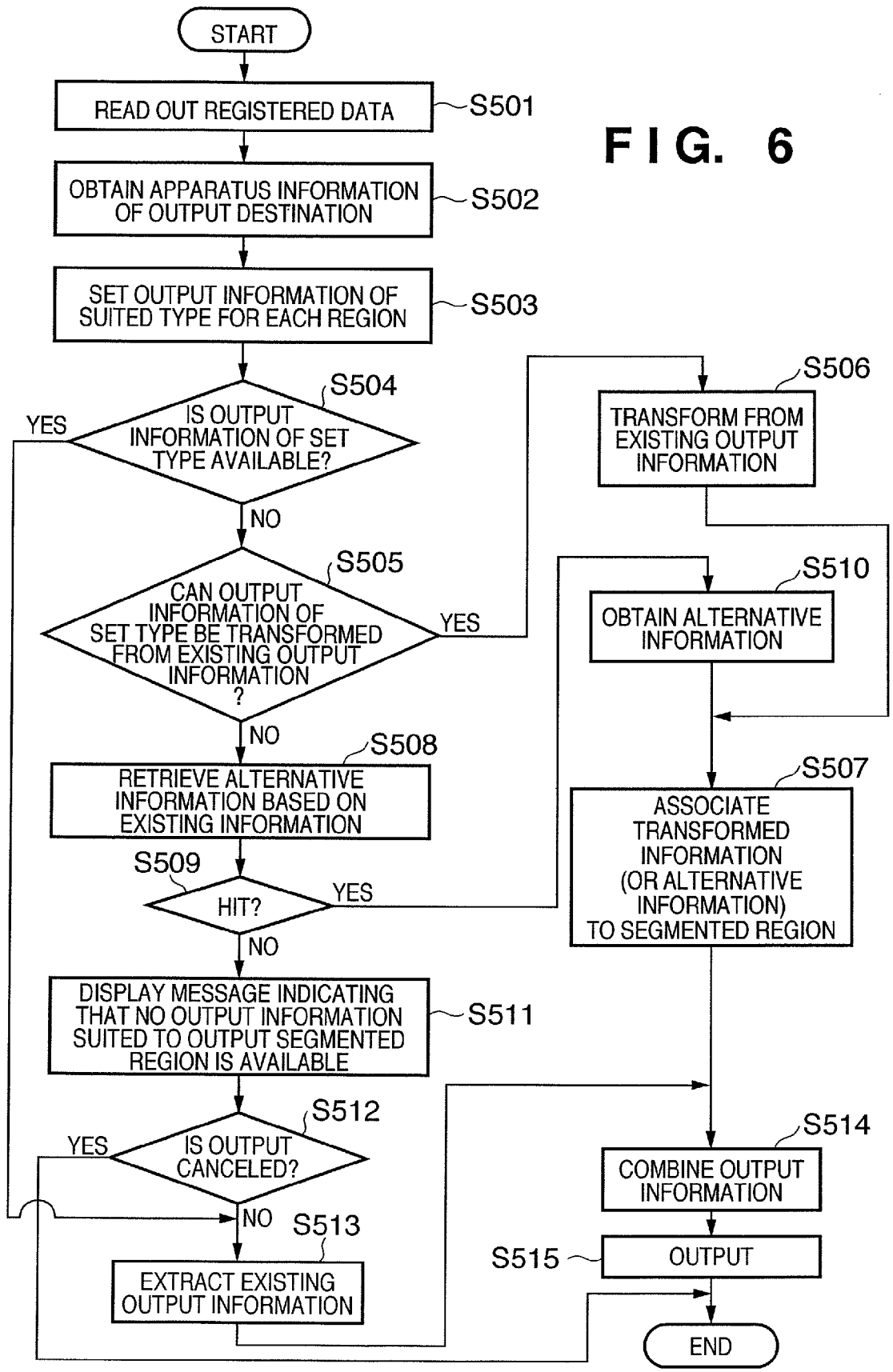
FIG. 6 is a flowchart showing processing for outputting output information.

FIG. 6 is a flowchart showing output processing for outputting output information. This processing is executed by the CPU 101 based on instructions of the user and the like.

Registered data designated by the user is read out from the HDD 104 or the like (S501), and apparatus information of its output destination is obtained (S502). Then, the type of output information to be output for each segmented region is set in correspondence with an output mode determined according to the output destination (S503). Note that details of this setting processing will be described later.

It is checked if output information of the set type is available as that for each segmented region (S504). Upon data registration, output information of each basic pattern is prepared. Therefore, pieces of output information for the basic patterns (monochrome printing and monitor display) are always available. On the other hand, output information of each applied pattern which has a low frequency of use is available if it is output information of the same type as the basic pattern. However, output information of a type different from the basic pattern is not available. Therefore, it is checked if output information of the set type is available. If such output information is available, the flow jumps to step S513; otherwise, the flow branches to step S505.

If the output information of the set type is available, that output information is extracted (S513), and pieces of output information for respective regions are combined (S514). The combined output information is output to the output destination (S515).

On the other hand, if no output information of the set type is available, it is checked if existing output information can be transformed to that of the set type (S505). If output information that can be transformed is available, the flow branches to step S506; otherwise, the flow branches to step S508.

FIG. 7 shows the types of output information which can be transformed from existing output information. In FIG. 7, ○ marks indicate that transformation is possible, and X marks indicate that transformation is impossible. Such information is stored in the HDD 104 or the like as a table.

For example, when enlarged display is to be made but a vector image suited to enlarged display is not available, it is checked whether or not existing output information which can be transformed into a vector image is available. If a raster image is available as output information, it can be transformed into a vector image, and the flow branches to step S506. On the other hand, when a digital image (FIG. 8) of a document obtained by monochrome-copying a color original shown in FIG. 4 is registered, and the output mode is color printing, output information required for color-printing a segmented region 302' is required. Hence, it is checked whether or not output information which can be transformed into a color raster image suited to color printing is available as that for the segmented region 302' of a monochrome photo attribute. In this case, since it is impossible to transform a monochrome raster image into a color raster image, as shown in FIG. 7, the flow branches to step S508.

If existing output information which can be used in transformation is available, that transform information is transformed into that of the set type (S506). The output information obtained by transformation (transformed information) is additionally described in the associated information of the document information and output information for the segmented regions generated upon data registration (S507). Then, pieces of output information for respective regions are combined (S514), and the combined output information is output to the output destination (S515).

If no existing output information that can be used in transformation is available, output information (alternative information) suited to the output mode is retrieved from the HDD 104 or server using the output information of the segmented region as a retrieval key (S508). It is checked if the retrieval hits (S509). If the retrieval hits, the flow advances step S510; otherwise, the flow advances to step S511. With this retrieval, when, for example, the segmented region of a monochrome photo attribute is to be color-printed, a similar color image is retrieved using the output information (monochrome image) of that region as a retrieval key. Details of this processing will be omitted. In brief, similar image retrieval can be appropriately made while leaving certain ambiguity by absorbing certain differences of image feature amounts due to a change in image angle, a change in object position, and photographing conditions. Note that a technique described in Japanese Patent Laid-Open No. 10-260983 or the like is available as a practical example of similar image retrieval.

If no alternative information is retrieved, a message indicating that no output information suited to output of the segmented region is available and a message that prompts the user to select use of existing output information or cancel of output are displayed on the display 105 (S511). Based on the determination result in step S512, if the user inputs an output cancel instruction, the processing ends; if he or she inputs a user instruction of existing output information, the flow advances to step S513.

For example, when enlarged display is to be made but a vector image suited to enlarged display is not available, it is checked whether or not existing output information which can be transformed into a vector image is available. If a raster image is available as output information, it can be transformed into a vector image, and the flow branches to step S506. On the other hand, when a digital image (FIG. 8) (having regions 301', 302', 303', 304', 305' and 306') of a document obtained by monochrome-copying a color original shown in FIG. 4 is registered, and the output mode is color printing, output information required for color-printing a segmented region 302' is required. Hence, it is checked whether or not output information which can be transformed into a color raster image suited to color printing is available as that for the segmented region 302' of a monochrome photo attribute. In this case, since it is impossible to transform a monochrome raster image into a color raster image, as shown in FIG. 7, the flow branches to step S508.

Although not shown in FIG. 6, the processes in steps S504 to S513 are repetitively executed for respective segmented regions.

[Setting of Output Information]

Processing (S503) for setting output information of each segmented region will be described below. As setting criteria, a feature of the generated output information itself is considered in addition to the attribute of the segmented region. The setting of output information will be described below for each pattern such as the basic patterns, applied patterns, and the like.

In case of monochrome printing as the basic pattern, output information to be obtained is faithful to an original copy, and has a high resolution. Hence, a raster image is set as output information of each segmented region.

Taking an original image shown in FIG. 4 as an example, pieces of output information provided as respective segmented regions are as follows.

| | |
|---|---|
| Text region 301 | Raster image |
| Photo region 302 | High-resolution raster image |
| Text region 303 | Raster image |
| Drawing region 304 | Raster image |
| Table region 305 | Raster image |
| Text region 306 | Raster image |

In case of monitor display as the basic pattern, a resolution as high as that for printing is not required, but output information which is clearly viewed on the monitor is required. In consideration of a case wherein character information is to be handled as text, output information is set based on the reliability of character recognition of the segmented region.

Figure 9:
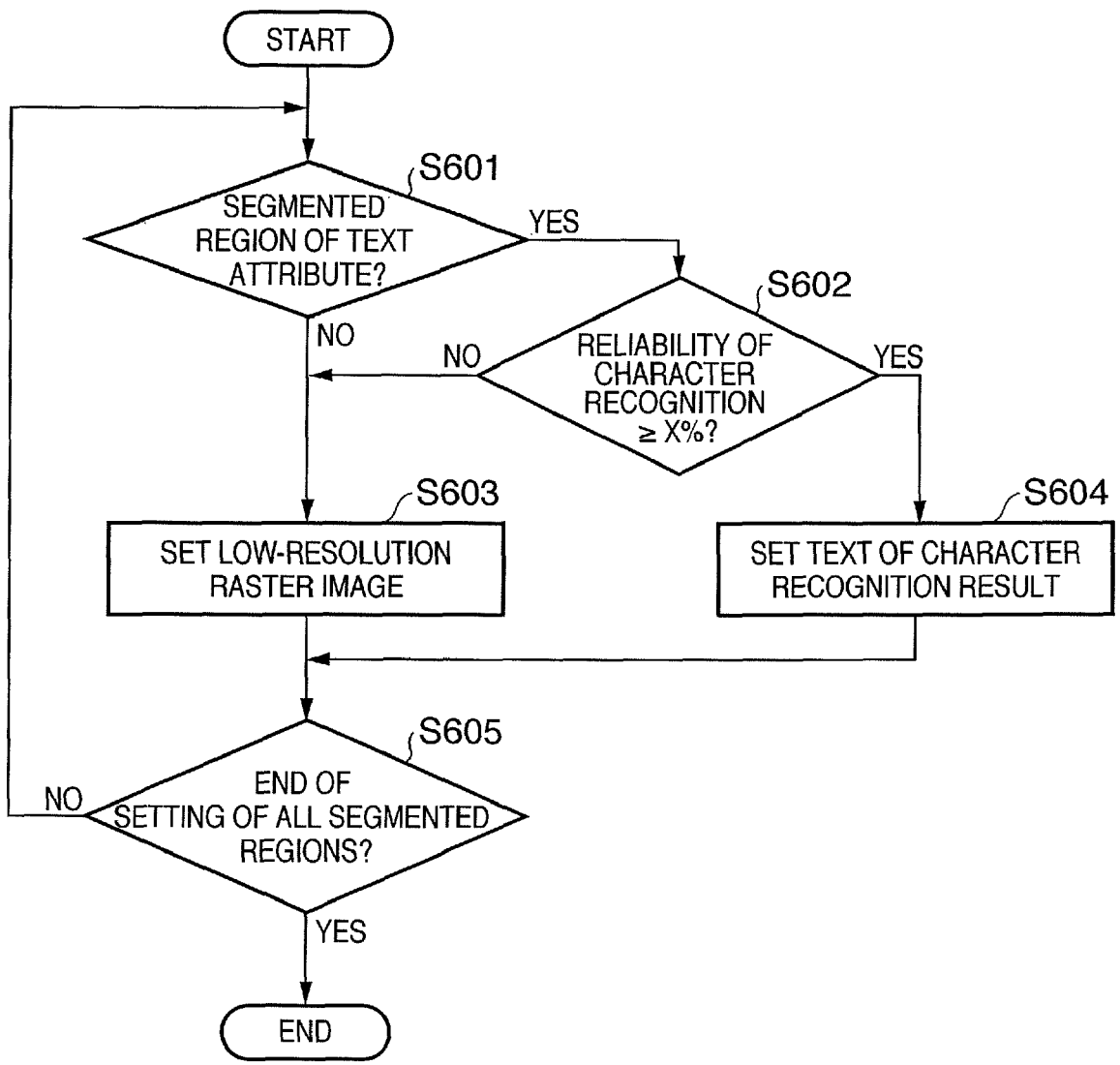
FIG. 9 is a flowchart for explaining setting processing of output information in case of monitor display.

FIG. 9 is a flowchart for explaining the output information setting processing (S503) in case of monitor display. This processing is executed by the CPU 101.

It is checked if the attribute of a segmented region of interest (to be referred to as an interest region hereinafter) is text (S601). If the interest region has a text attribute, it is checked based on the output information associated with the interest region if the reliability of character recognition is equal to or higher than a predetermined value X % (S602).

For the region of an attribute other than the text attribute and the region of the text attribute having a reliability of character recognition less than X %, a low-resolution raster image is set (S603). For the region with the text attribute having a reliability of character recognition equal to or higher than X %, text of the character recognition result is set (S604).

It is checked if the types of output information are set for all the segmented regions in the document image (S605). If segmented regions to be set still remain, the flow returns to step S601; otherwise, the processing ends (the flow advances to step S504 shown in FIG. 6).

When the processing shown in FIG. 9 is executed, output information to be provided as each segmented region of the document image shown in FIG. 4 is as follows.

| Text region 301 | Low-resolution raster image (low reliability) |
| Photo region 302 | Low-resolution raster image |
| Text region 303 | Text (high reliability) |
| Drawing region 304 | Low-resolution raster image |
| Table region 305 | Low-resolution raster image |
| Text region 306 | Text (high reliability) |

The setting processing of output information for the applied patterns (color printing, high image quality printing, PDA display, enlarged display, ultra enlarged display, and modification) will be described below.

In case of color printing, color information is required in addition to the conditions defined by monochrome printing. In case of high image quality printing, a raster image having a resolution higher than the conditions defined by monochrome printing and color printing is required. In case of PDA display, the PDA has a limited memory size, and output information which has a small data size and allows a high processing speed is preferentially set.

Figure 10:
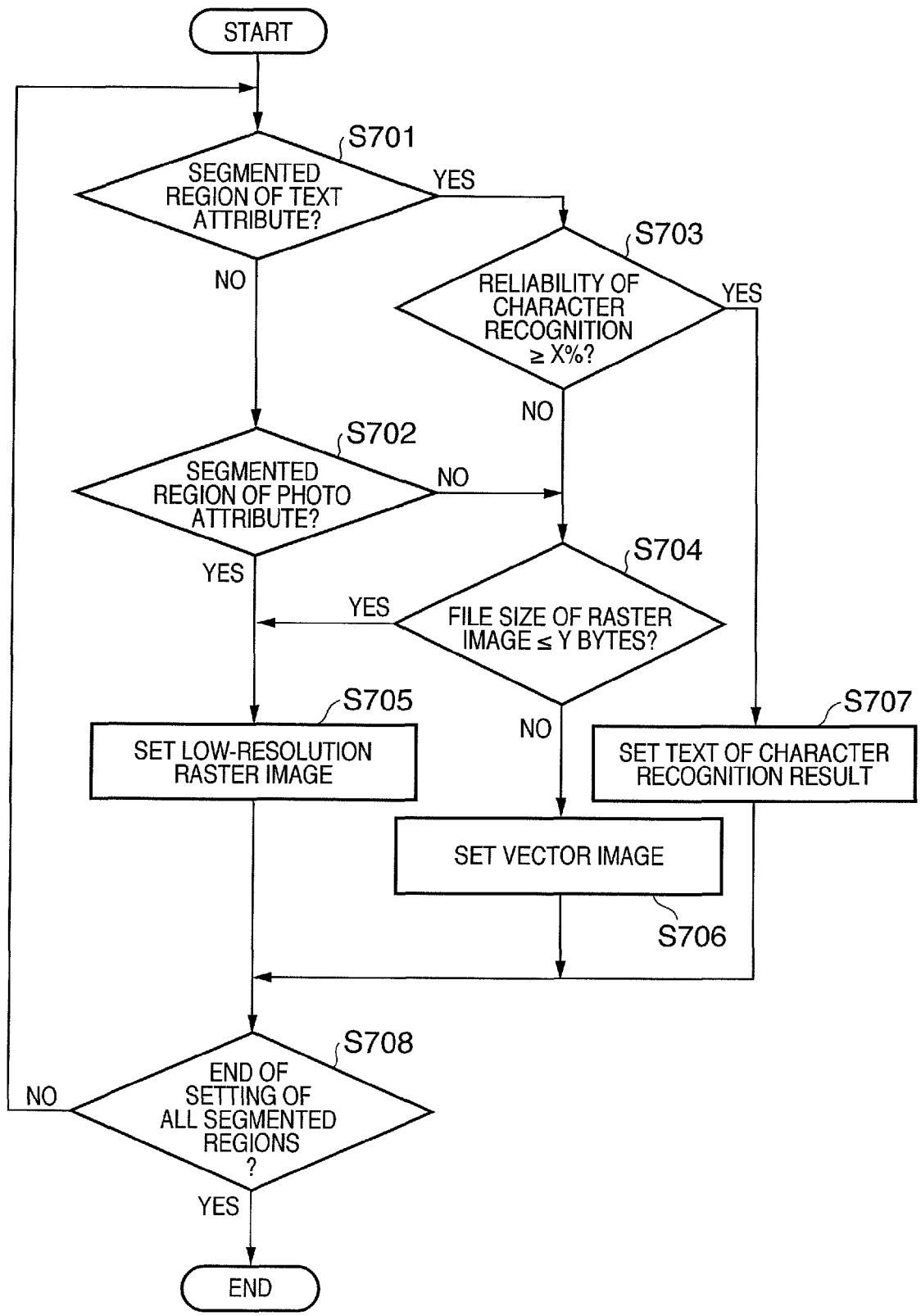
FIG. 10 is a flowchart for explaining setting processing of output information in case of PDA display.

FIG. 10 is a flowchart for explaining the output information setting processing (S503) in case of PDA display. This processing is executed by the CPU 101.

It is checked if the attribute of an interest segmented is text (S701). If the interest region has a text attribute, it is checked based on the output information associated with the interest region if the reliability of character recognition is equal to or higher than a predetermined value X % (S703). For the region of the text attribute having a reliability of character recognition equal to or higher than X %, text of the character recognition result is set (S707).

If the interest region has an attribute other than the text attribute, it is checked if the attribute of the interest region is photo (S702). If the interest region has a photo attribute, a low-resolution raster image is set (S705).

If the interest region has neither the text attribute nor the photo attribute or if the reliability of character recognition of the interest region of the text attribute is less than X %, it is checked based on the output information associated with the interest region if the file size of a raster image is Y bytes or less (S704). Since the raster image whose file size is Y bytes or less is suited to PDA display, a low-resolution raster image is set in this case (S705). If the file size of the raster image exceeds Y bytes, that raster image is not suited to PDA display, so a vector image is set (S706).

It is checked if the types of output information are set for all the segmented regions in the document image (S708). If segmented regions to be set still remain, the flow returns to step S701; otherwise, the processing ends (the flow advances to step S504 shown in FIG. 6).

When the processing shown in FIG. 10 is executed, output information to be provided as each segmented region of the document image shown in FIG. 4 is as follows.

| Text region 301 | Vector image (low reliability and data size of Y bytes or more) |
| Photo region 302 | Low-resolution raster image |
| Text region 303 | Text (high reliability) |
| Drawing region 304 | Vector image (data size of Y bytes or more) |
| Table region 305 | Low-resolution raster image |
| Text region 306 | Text (high reliability) |

Next, in case of enlarged display, output information which is faithful to an original copy and is free from deterioration even after enlargement is set. Note that there may be a plurality of regions to be enlarged, or a part of a region may be enlarged.

Figure 11:
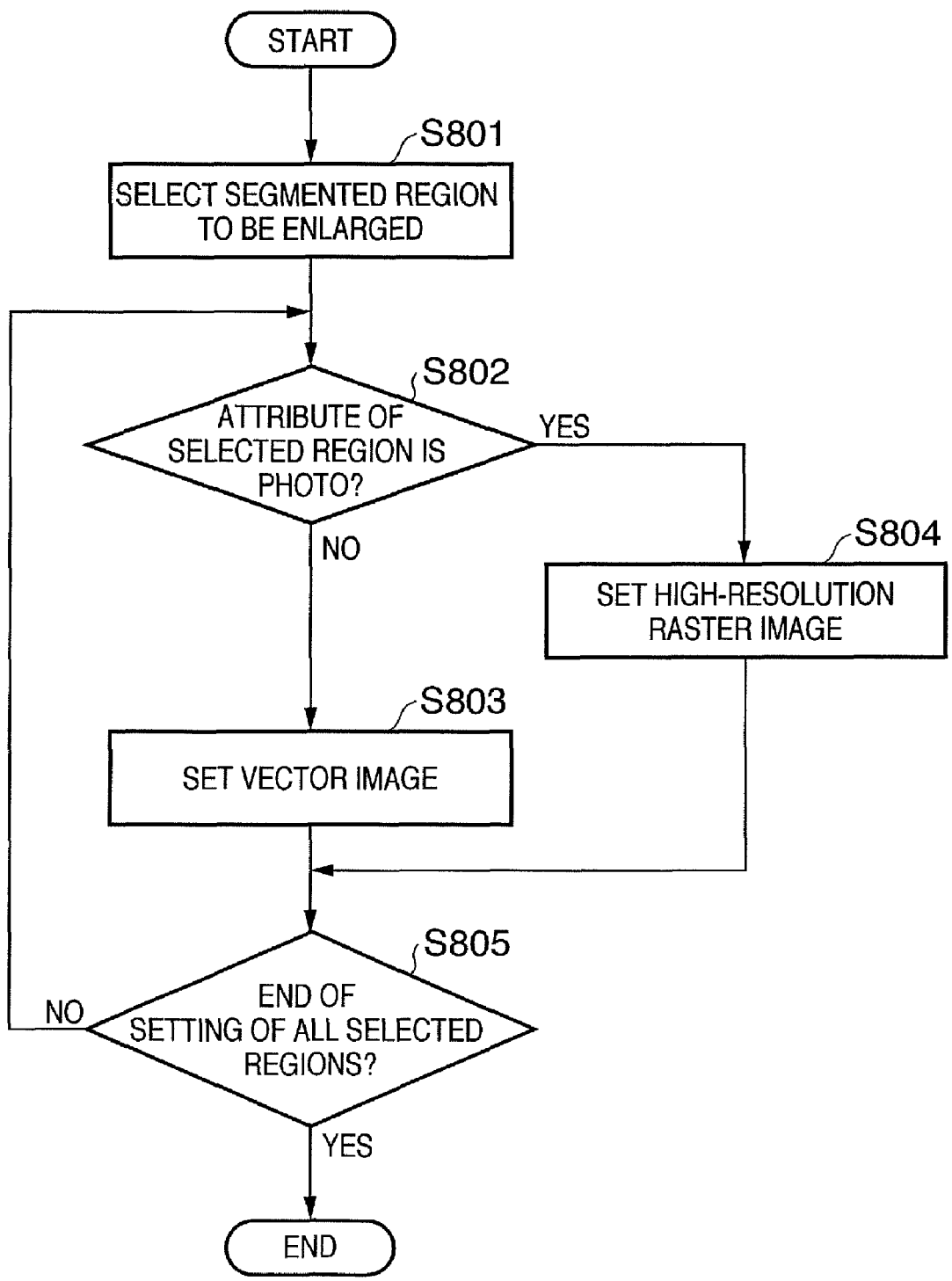
FIG. 11 is a flowchart for explaining setting processing of output information in case of enlarged display.

FIG. 11 is a flowchart for explaining the output information setting processing (S503) in case of enlarged display. This processing is executed by the CPU 101.

A segmented region to be enlarged in the document image is selected (S801). In this case, a region may be set across attributes.

It is checked if the attribute of the interest region is photo (S802). If the interest region has a photo attribute, a high-resolution raster image is set (S804). If the interest region has an attribute other than the photo attribute, a vector image is set (S803). It is checked if the types of output information are set for all the segmented regions in the digital image (S805). If segmented regions to be set still remain, the flow returns to step S801; otherwise, the processing ends (the flow advances to step S504 shown in FIG. 6).

When the processing shown in FIG. 11 is executed upon enlarging a part (a region 901 shown in FIG. 12) of the segmented regions 302 and 305 shown in FIG. 4, output information to be provided as an enlarged region 901 shown in FIG. 12 is as follows.

| Photo region 302 | High-resolution raster image |
| Table region 305 | Vector image |

Next, in case of ultra enlarged display, output information which is free from deterioration even after enlargement more than enlarged display described above is required.

Figure 13:
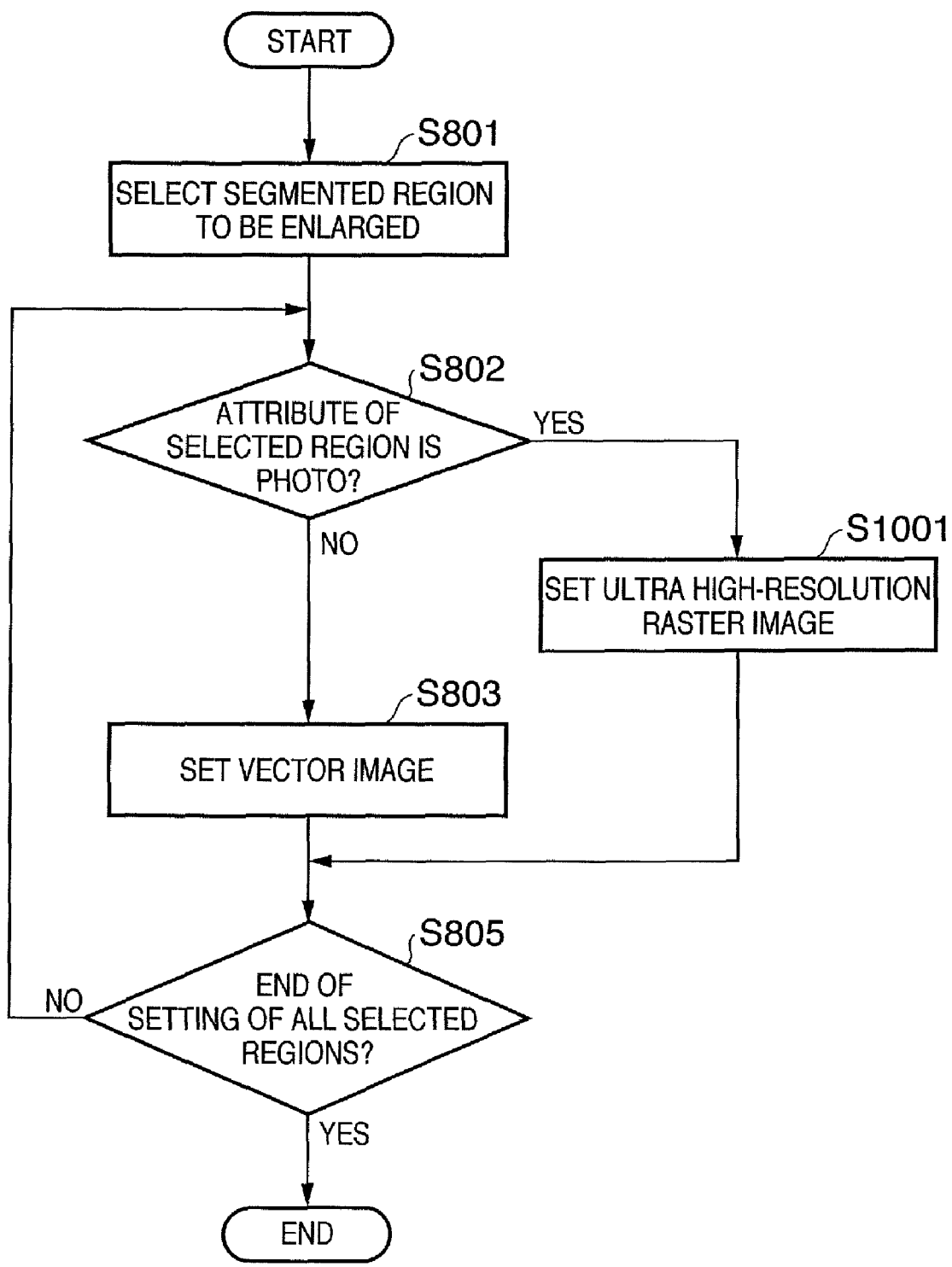
FIG. 13 is a flowchart for explaining setting processing of output information in case of ultra enlarged display.

FIG. 13 is a flowchart for explaining the output information setting processing (S503) in case of ultra enlarged display. This processing is executed by the CPU 101. In case of enlarged display shown in FIG. 11, for enlarged display of the region of the photo attribute, a high-resolution raster image is set (S804). However, in case of ultra enlarged display shown in FIG. 13, an ultra high-resolution raster image is set for ultra enlarged display of the region of the photo attribute (S1001). Ultra enlarged display is different from enlarged display in this process, but other processes are the same as those of enlarged display.

When the processing shown in FIG. 13 is executed upon ultra-enlarging a part (a region 901 shown in FIG. 12) of the segmented regions 302 and 305 shown in FIG. 4, output information to be provided as an ultra enlarged region 901 shown in FIG. 12 is as follows.

| | |
|---|---|
| Photo region 302 | Ultra high-resolution raster image |
| Table region 305 | Vector image |

In the above description, output information is automatically set for each pattern. However, such automatic setting cannot often obtain output information that the user wants. Hence, as shown in FIG. 3, the manual mode which allows the user to determine the output mode and output information corresponding to each region attribute is prepared. For example, the user can set text of the character recognition result as the output information of the table region 305 of the digital image shown in FIG. 4. Also, the user can create templates like the five different setting methods described above in the manual mode.

[Association of Transformed Information (Alternative Information)]

Processing (S507) for associating transformed information (alternative information) will be described below.

FIG. 14 is a view illustrating information which associates document information and output information of each segmented region.

Document information 1101 of a given segmented region holds output information 1102 (existing output information generated upon data registration) of that region. When new output information is obtained in step S506 or S510, output information 1103 (new output information) is added. Of course, such addition may be limited to a case wherein the newly obtained output information 1103 is more likely to be re-used in the future or a memory that saves the output information has an enough margin. If the output information is added, as shown in FIG. 14, when the output information 1103 is required again, it can be used immediately.

Second Embodiment

An image processing apparatus and method thereof according to the second embodiment of the present invention will be described hereinafter. Note that the same reference numerals in the second embodiment denote the same parts as in the first embodiment, and a detailed description thereof will be omitted.

[Registration Processing]

Figure 15:
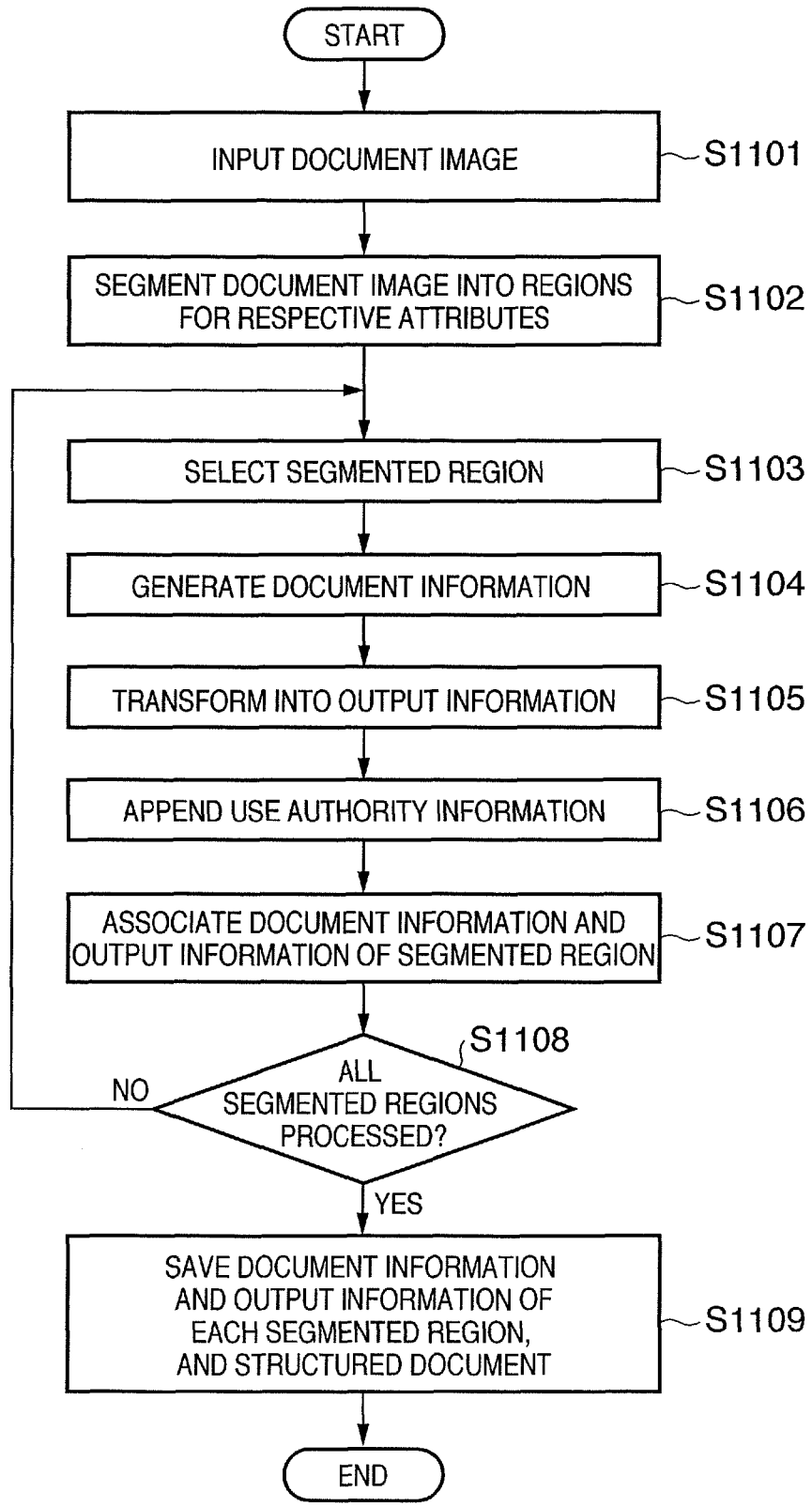
FIG. 15 is a flowchart showing processing for registering data in an image processing apparatus according to the second embodiment.

FIG. 15 is a flowchart showing processing for registering data in the image processing apparatus. This processing is executed by the CPU 101 based on instructions of the user and the like. Note that data registration indicates processing which processes a document image read via the scanner 108 or network I/F 109, and stores the processed document image in the RAM 103 or HDD 104.

A document image to be registered is input from the scanner 108 or network 110 (S1101), and is segmented into regions having attributes such as text, photo, table, line art, and the like (S1102). Then, one of the segmented regions is selected (S1103).

Document information of the selected segmented region is generated (S1104).

The document information of the selected segmented region is transformed into output information (S1105).

For example, a given segmented region of a document often includes a photo which is not free from trademarks or copyrights, text including confidential information, or the like. In such case, output information which has the same data format but has different display contents can be prepared. That is, a combination of output information obtained by rendering document information intact, and output information in which invisible processing such as mosaic, black-out, and the like is applied to the corresponding segmented region is prepared. Alternatively, another information which poses no problem such as a copyright-free photo which has similar contents may be obtained from a database on the network 110, and may be added as one output information.

An example wherein the photo region of the document shown in FIG. 4 includes a copyrighted photo and the following three pieces of output information are prepared will be explained below: (1) output information obtained by rendering document information intact, (2) output information to which mosaic processing is applied, and (3) output information having a similar photo free from copyrights. FIG. 16 shows an example of output information generated based on the document image shown in FIG. 4 by the above processing.

Figure 17C:
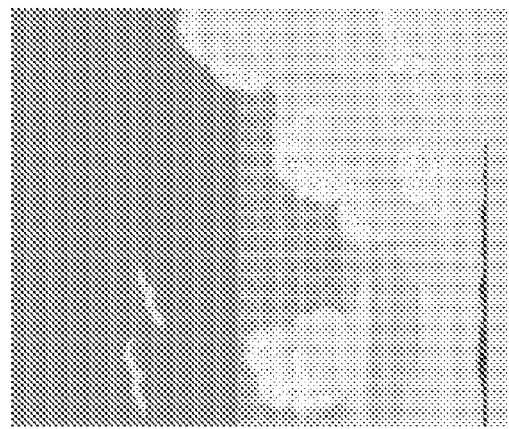
FIGS. 17A to 17C are views showing an example of a output information group of a photo region.
Figure 17B:
Figure 17A:
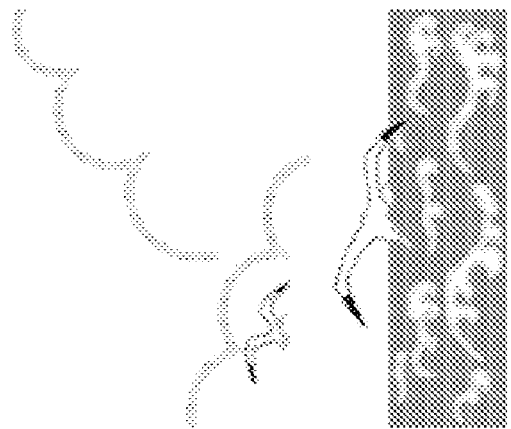

FIGS. 17A to 17C show examples of a output information group of the photo region 302. FIG. 17A shows a photo obtained by rendering a document image intact, FIG. 17B shows a photo obtained by applying mosaic modification to the photo shown in FIG. 17A, and FIG. 17C is a copyright-free photo which is similar to that shown in FIG. 17A.

Next, use authority information is appended to the document information and output information (S1106). Details of the use authority information will be explained later.

A structured document which associates document information and output information of the segmented region and is described in a tree structure is generated (S1107). Note that association between the document information and output information of each segmented region is as has been explained previously using FIG. 5.

It is checked if processing for all the segmented region is completed (S1108). The processes in steps S1103 to S1107 are repeated until the processing for all the segmented region is completed.

Finally, the generated data group (document information and output information of the respective segmented regions and the structured document) is saved (registered) in the HDD 104 or the like (S1109). Note that the save destination of the data group may be a server on the network 110.

[Use Authority Information]

Figure 18:
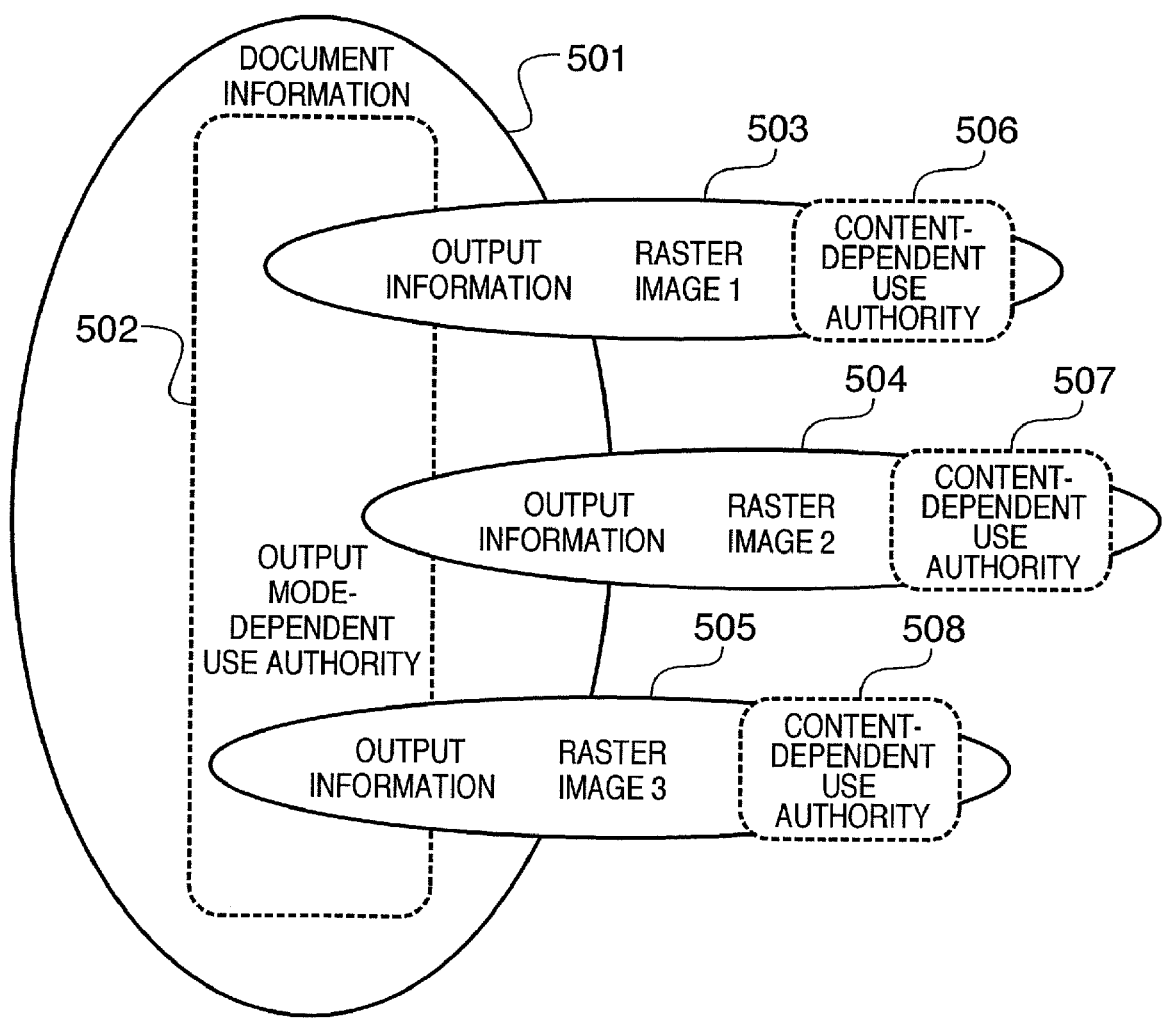
FIG. 18 shows an example of the relationship among document information, output information, and use authority information of a given segmented region.

FIG. 18 shows an example of the relationship among the document information, output information, and use authority information of a given segmented region.

The use authority information includes two types of use authorities, i.e., an output mode-dependent use authority which is set for each use purpose of output information, and a content-dependent use authority which is set for each content of output information. One segmented region includes one document information 501 and a plurality of pieces of output information 503 to 505. An output mode-dependent use authority 502 as one of the use authority information is set for the document information 501, and content-dependent use authorities 506 to 508 are set for the respective pieces of output information 503 to 505.

The output mode-dependent use authority has the effect on all pieces of output information included in that segmented region, and the content-dependent use authority has the effect on the corresponding output information. That is, in FIG. 18, the output mode-dependent use authority 502 has the effect on the three pieces of output information 503 to 505, and the content-dependent use authority 506 has the effect on only the output information 503.

FIGS. 19A and 19B show examples of tables indicating the output mode-dependent use authority 502. This table is held for each segmented region. That is, the output mode-dependent use authority 502 limits available output modes in accordance with a user's use authority level. For example, in FIG.

19A, a user of use authority level 1 can select every output modes, but the outputs that a user of use authority level 3 can select are limited to monochrome printing, monitor display, and enlarged display.

Since different output mode-dependent use authorities 502 are available for respective segmented regions, the table contents are different for respective segmented regions, as shown in FIGS. 19A and 19B. By holding such table as the output mode-dependent use authority 502, the output of the segmented region can be limited for confidential information, privacy information, a copyrighted photo, or the like included in the document image according to the use authority level.

FIGS. 20A to 20D show examples of tables indicating the content-dependent use authorities. This table is held for each output information. That is, the content-dependent use authority determines according to the user's use authority level whether or not corresponding output information itself can be used. For example, copyrighted output information and copyright-free output information are prepared in a given segmented region. Then, the following usage is allowed. That is, the copyrighted output information is allowed to be used by a member (user) of paid membership, and the copyright-free output information is provided to a member (user) of free membership.

That is, by combining the output mode-dependent use authority and content-dependent use authority, the following use limitations can be set for the photo region 302 shown in FIG. 4. The output mode-dependent use authority shown in FIG. 19A is set for the photo region 302. The content-dependent use authority shown in FIG. 20A is set for output information corresponding to FIG. 17A (original image), that shown in FIG. 20B is set for FIG. 17B (mosaic image), and that shown in FIG. 20C is set for FIG. 17C (copyright-free image). In this way, a user of use authority level 1 can select all the output modes such as color or monochrome printing, display, modification, and the like of the original image. A user of use authority level 2 can select color or monochrome printing (except for high image quality) and display (except for PDA display) of the mosaic image. A user of use authority level 3 can select monochrome printing, monitor display, and enlarged display of the copyright-free image.

For the segmented regions except for the photo region 302 shown in FIG. 4, the output mode-dependent use authority shown in FIG. 19B is set, and the content-dependent use authority shown in FIG. 20D is set for respective pieces of output information. Therefore, all the output modes are available for the segmented regions except for the photo region 302 irrespective of the user's use authority level.

[Output of Output Information]

The output processing of output information will be described below. The output processing of output information indicates processing for outputting the document information and output information of the respective segmented regions, and the structured document registered in the RAM 103 or HDD 104 (to be referred to as "registered data" hereinafter) to output apparatuses such as the display 105, a printer or PDA (not shown), or the like.

Figure 21:
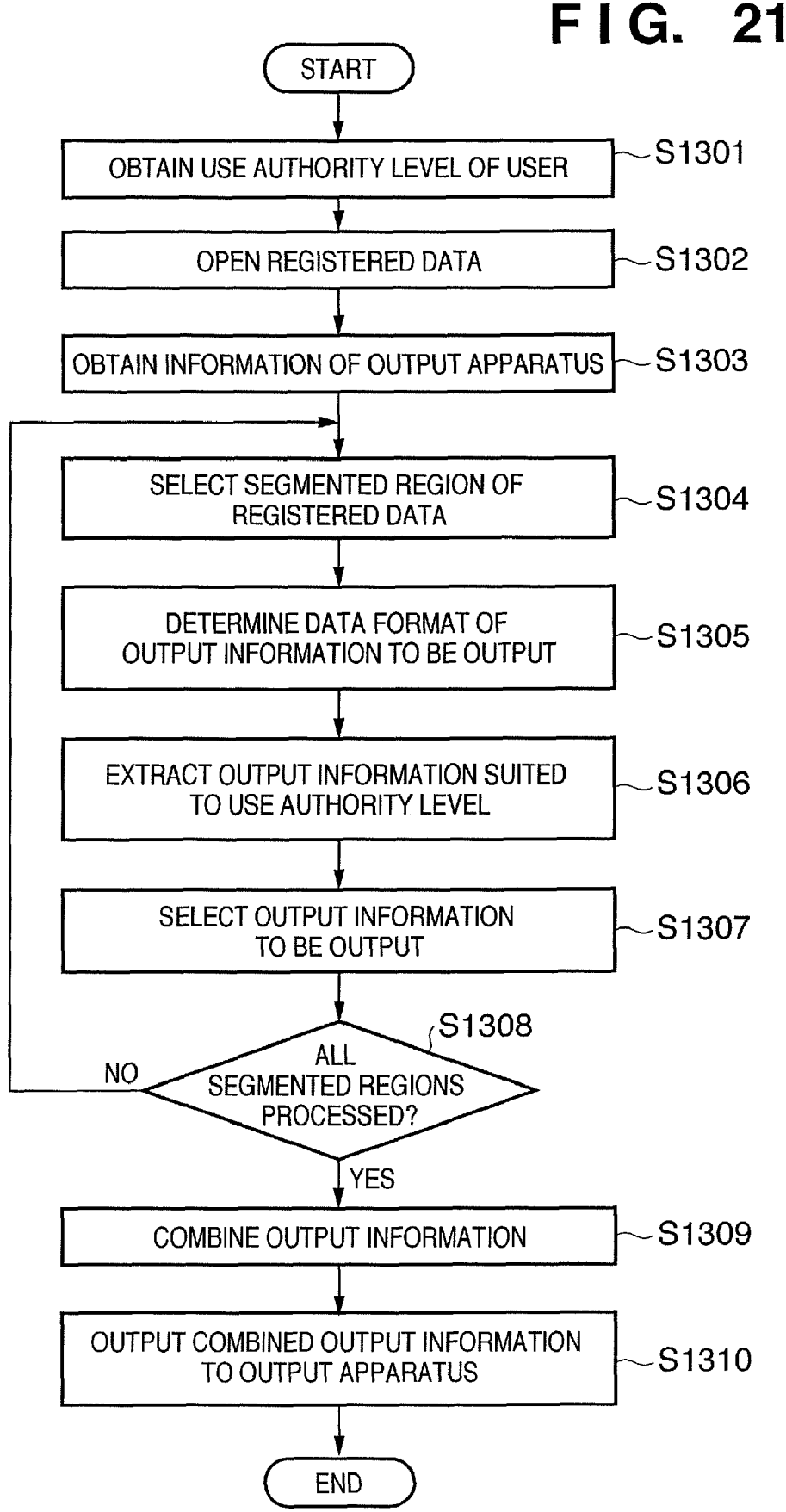
FIG. 21 is a flowchart showing processing for outputting output information.

FIG. 21 is a flowchart showing processing for outputting output information. This processing is executed by the CPU 101 according to instructions of the user and the like.

A user's use authority level is obtained (S1301). This level can be obtained from a database server on the network 110 based on user information input via, e.g., the keyboard 106.

Registered data is opened (S1302), information of an output apparatus as the output destination is obtained (S1303), and one of segmented regions included in the registered data is selected (S1304). Then, a data format of the selected segmented region corresponding to the conditions of the output destination is determined (S1305).

Next, the user's use authority level is compared with the output mode-dependent use authority and content-dependent use authorities of the segmented region to extract output information suited to the user's use authority level (S1306). Output information of the data format determined in step S1305 is selected from the extracted output information (S1307). If no output information of the corresponding data format is available, a message that advises accordingly is sent to the user, and the flow advances to the next processing.

It is checked if processing of all the segmented regions of the registered data is completed (S1308), and the processes in steps S1304 to S1307 are repeated until the processing of all the segmented regions of the registered data is completed.

Upon completion of the processing of all the segmented regions, respective pieces of output information selected from the segmented regions are combined (S1309), and the combined output information is output to the output apparatus (S1310).

FIGS. 22A to 22D show output examples of the registered data corresponding to the document image shown in FIG. 4.

In case of a user of use authority level 1, a document image shown in FIG. 22A is output. Since the user of use authority level 1 can output the original image shown in FIG. 17A of the output information of the photo region 302, he or she can output nearly the same document image as that shown in FIG. 4.

In case of a user of use authority level 2, a document image shown in FIG. 22B is output. Since the user of use authority level 2 can output the mosaic image shown in FIG. 17B of the output information of the photo region 302, he or she can output nearly the same document image as that shown in FIG. 4, except that the photo region 302 has undergone mosaic processing.

In case of a user of use authority level 3, a document image shown in FIG. 22C is output. Since the user of use authority level 3 can output the copyright-free image shown in FIG. 17C he or she can output nearly the same document image as that shown in FIG. 4, except that the image of the photo region 302 has been replaced.

The user of use authority level 2 cannot select high image quality printing and PDA display for the photo region 302. Also, the user of use authority level 3 cannot select color printing, monochrome high image quality printing, PDA display, and ultra enlarged display. Therefore, when the user of use authority level 2 or 3 issues a print or display instruction which is not permitted, the photo region 302 is not printed or displayed (blank state), as shown in FIG. 22D.

In this way, a plurality of types of output information of an identical data format can be prepared for each segmented region, and output information according to the use authority level of the user can be selected and output for each segmented region. Therefore, for each object of a document, the document can be output while replacing the data format or data itself according to the output mode of the document, contents of the object, and user's use authority.

Third Embodiment

An image processing apparatus and method thereof according to the third embodiment of the present invention will be described hereinafter. Note that the same reference numerals in the third embodiment denote the same parts as in the first and second embodiments, and a detailed description thereof will be omitted.

To support all the output modes, all the types of data formats of output information can be prepared upon data registration. However, only some types of output information of the data formats which are expected to be frequently used may be prepared. Then, the user preferably sets the data formats of output information for respective region attributes in advance, which are prepared in correspondence with the output modes.

In the following description, monochrome printing and monitor display will be explained as basic patterns, and other output modes will be explained as applied patterns. That is, outputs in the applied patterns are assumed to have a lower frequency of use than the basic patterns.

When output information is to be output in the applied mode, the segmented region often does not include output information of a desired data format. In such case, existing output information is transformed into that of the desired data format, or output information of the desired data format is retrieved from a database using the existing output information as a retrieval key. In the third embodiment, whether transformation or retrieval is executed is determined according to the user's use authority level.

FIGS. 23A and 23B show output mode-dependent use authorities to be set for the document image shown in FIG. 4. The mode-dependent use authority shown in FIG. 23A is set for the photo region 302, and that shown in FIG. 23B is set for other segmented regions. The content-dependent use authorities of output information shown in FIGS. 22A to 22D are set as in the second embodiment.

The following description will be given under the assumption that the frequency of use of monochrome printing is high as the output mode, and the following pieces of output information are prepared in the transformation processing (S1105) to output information.

| | |
|---|---|
| Text region | Raster image |
| Photo region | Grayscale raster image |
| Line art region | Raster image |
| Table region | Raster image |

Transformation and Retrieval of Output Information

Figure 24:
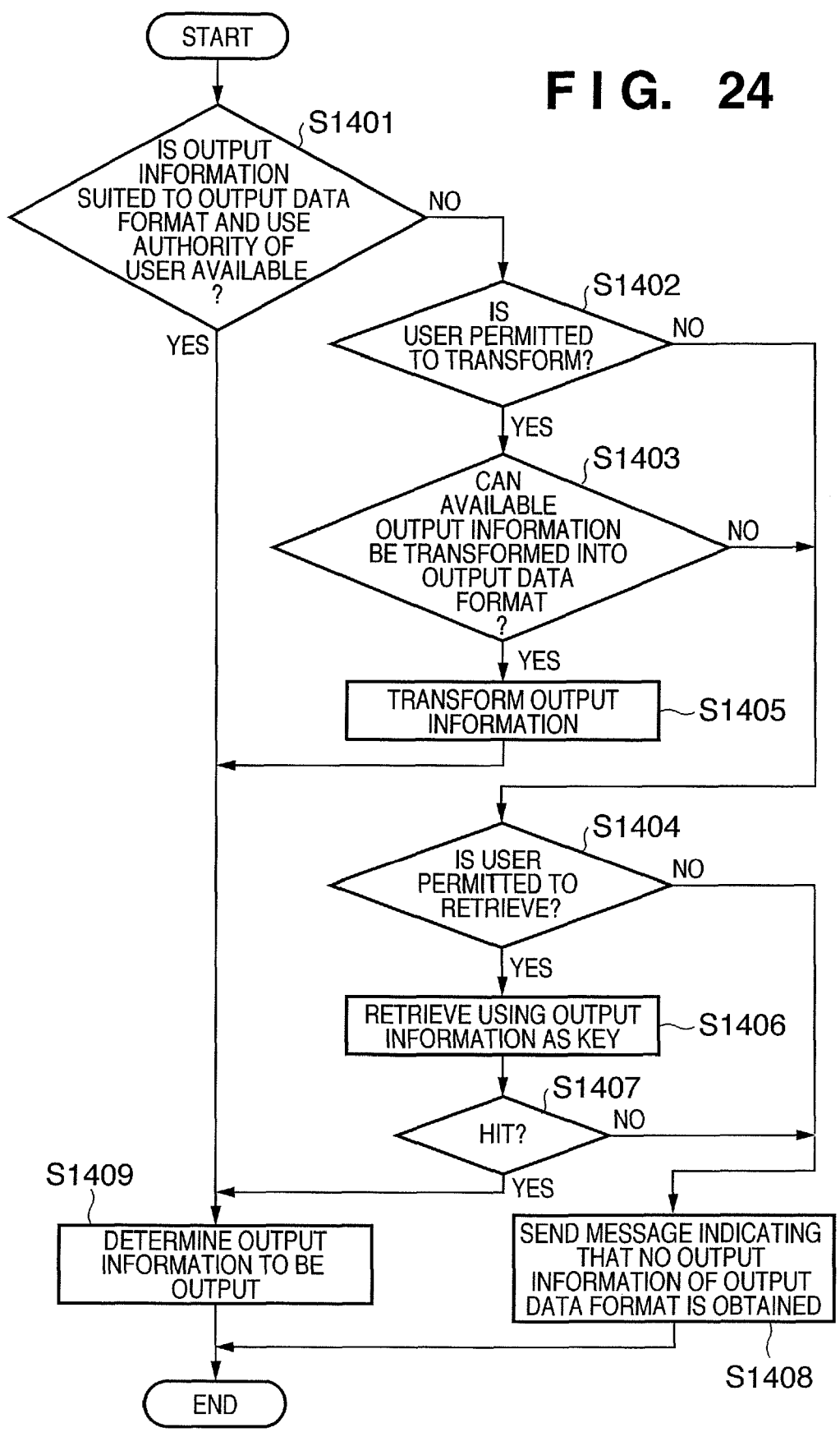
FIG. 24 is a flowchart for explaining processing executed when output information cannot be output based on only those which are prepared for registered data.

FIG. 24 is a flowchart showing processing executed when output information cannot be output based on only those which are prepared for registered data. This processing is executed by the CPU 101 based on instructions of the user and the like.

It is checked if output information suited to the output data format and user's use authority level is available (S1401). If such output information is available, the flow jumps to step S1409.

If no output information suited to the output data format and user's use authority level is available, the output mode-dependent use authority of the segmented region is checked to see if the user is permitted to transform output information (S1402). If the user is permitted, the flow advances to step S1403; otherwise, the flow jumps to step S1404.

If the user is permitted to transform output information, it is checked if available output information can be transformed into the required data format (S1403). The transformable data formats are set in advance (see FIG. 7). If available output information can be transformed, it is converted into the output data format (S1405), and the flow jumps to step S1409. On the other hand, if available output information cannot be transformed, the flow jumps to step S1404.

If the user is not permitted to transform output information, or if it is impossible to transform output information, the output mode-dependent use authority of the segmented region is checked to see if the user is permitted to retrieve output information (S1404). If the user is not permitted to retrieve, the flow jumps to step S1408.

On the other hand, if the user is permitted to retrieve output information, information suited to the output mode is retrieved using the output information of the segmented region as a retrieval key. Note that the user's use authority level is considered upon retrieval. For example, when output information of a monochrome image is to be color-printed, a similar color image is retrieved using that monochrome image as a retrieval key (S1406).

It is checked if the retrieval produces a hit (S1407). Even in the same segmented region, available data changes depending on the user's use authority level. For example, copyrighted data can be provided to the user who paid for the copyrights, and copyright-free data with similar contents is provided to the user who does not pay for the copyrights. If the retrieval produces a hit, the flow advances to step S1409; otherwise (or if no hit has occurred within a predetermined retrieval time period), the flow advances to step S1408.

If the output information of the output data format is available, or if the output information suited to the output data format is obtained by transformation or retrieval, that output information is determined as that to be output (S1409), thus ending the processing.

In some cases, no output information of the output data format is available, and the user is not permitted to transform and retrieve output information, or no hit has occurred although the user is permitted to retrieve output information. In such case, a message indicating that output information of the output data format cannot be obtained is sent to the user (S1408), thus ending the processing of the segmented region.

Output of Output Information

Processing of the photo region 302 when output information of a data format for color printing is obtained from registered data which includes only output information for monochrome printing, as described above, and color printing is executed will be described below.

A user of use authority level 1 can use the color printing mode for all the segmented region. However, the output information of the photo region 302 includes a monochrome image, and does not have any data format for color printing. The user is permitted to transform the output information of the photo region 302 but the monochrome image cannot be transformed into a color image. However, since the user is permitted to retrieve another information using the output information of the photo region 302 as a retrieval key, he or she retrieves a color image using the monochrome image as a retrieval key, and color-prints the document image using the hit output information as that of the photo region 302.

A user of use authority level 2 can use the color printing mode for all the segmented region. However, the output information of the photo region 302 includes a monochrome image, and does not have any data format for color printing. The user is permitted to transform the output information of the photo region 302 but the monochrome image cannot be transformed into a color image. Furthermore, the user is not permitted to retrieve another information using the output information of the photo region 302 as a retrieval key. Therefore, a message indicating that a color image of the photo region 302 cannot be output is sent to the user, and the document image is color-printed using the monochrome image as the output information of the photo region 302.

A user of use authority level 3 can use the color printing mode for segmented regions other than the photo region 302 but cannot use the color printing mode for the photo region 302. Therefore, a message indicating that a color image of the photo region 302 cannot be output is sent to the user, and the document image is color-printed using the monochrome image as the output information of the photo region 302.

In this manner, a plurality of types of output information of the same data format are prepared for each segmented region, and output information according to the use authority level of the user can be selected and output for each segmented region. Therefore, for each object of a document, the document can be output while replacing the data format or data itself according to the output mode of the document, contents of the object, and user's use authority.

As described above, since permission/inhibition of transformation of existing output information, and that of retrieval using existing output information as a retrieval key are set for each segmented region, if no output information of a data format suited to the output mode is available, appropriate output information can be output as much as possible.

Modification of Embodiments

In the above embodiments, the example in which output information corresponding to a segmented region of a text attribute includes text of the character recognition result has been explained. Alternatively, text of a translation result obtained by translating that text into another language may be prepared.

The output information corresponding to each segmented region has been explained as visual information. Alternatively, audible information obtained by converting a feature of each segmented region into audible data may be prepared as output information of the segmented region. For example, the photo of the segmented region 302 of the photo attribute in FIG. 4 shows a state wherein two birds are flying against a background of sky and sea. In this case, audio information such as a "photo that shows sky, sea, and two flying birds" or the like is appended to output information. On the other hand, audio information that reads aloud text of the character recognition result is appended to the segmented region 303 of the text attribute shown in FIG. 4.

As output information of each segmented region, tactile information corresponding to a feature of that region may be prepared. For example, for a segmented region of a text attribute, information obtained by converting text of the character recognition result into Braille is appended. For a segmented region of a line art attribute, tactile information of concavity and convexity of each line is appended. For a segmented region of a photo attribute, tactile information of a three-dimensional shape, grain, or the like of an object of that region is appended.

Alternatively, as output information of each segmented region, olfactory information corresponding to a feature of that region may be prepared. For example, since the segmented region 302 of the photo attribute shown in FIG. 4 shows sea, information of salt tang of sea is appended to the output information.

Furthermore, as output information of each segmented region, gustatory information corresponding to a feature of that region may be prepared. For example, when a segmented region of a photo attribute shows food, the gustatory information of that food is appended as the output information of that region.

In this way, a plurality of types of output information are prepared for respective regions. Upon outputting output information, output information of an appropriate type is selected for each region, thus providing output information in correspondence with various output environments and requests. When no output information of an appropriate type is available upon outputting, processing for transforming existing information into appropriate one is executed, thus reducing the data size in an initial state, and flexibly coping with a user's dynamic request. Of course, since the output information of the type newly created by transformation is additionally associated with the segmented region, re-usability of that output information can be improved.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2005-253793, filed Sep. 1, 2005, No. 2005-363864, filed Dec. 16, 2005 which are hereby incorporated by reference herein in their entirety.

What is claimed is:

1. An image processing method executed by an image processing apparatus, the method comprising:

a dividing step of dividing a registered document image into a plurality of regions based on image attributes;

a transforming step of transforming an image of each region divided in the dividing step into plural types of output information, wherein a data format of each type of the output information is expected to be used frequently;

a generating step of generating structured document information which indicates a structure of the registered document image by associating the output information with respective regions;

a storing step of storing the structured document information and the plural types of output information for each region in a memory as a registered document;

a first obtaining step of obtaining information of an output destination of the registered document stored in the memory;

a determining step of determining types of the output information to be output for respective regions in the registered document, based on both the information of the output destination and the image attributes of the respective regions;

a second obtaining step of obtaining a plurality of the output information corresponding to the determined types for the respective regions;

a combining step of combining the plurality of the output information obtained for the respective regions into combined document data; and an outputting step of outputting the combined document data to the output destination, wherein in the second obtaining step, if the output information corresponding to a type determined for a region is stored in the memory, the output information corresponding to the determined type is obtained for the region from the memory, wherein in the second obtaining step, if the output information corresponding to a type determined for a region is not stored in the memory, the output information corresponding to another type is obtained from the memory, and the obtained output information is transformed into the output information corresponding to the determined type for the region.

2. The method according to claim 1, further comprising the step of storing the output information obtained by the transformation in the second obtaining step in the memory in association with the region.

3. The method according to claim 1, wherein in the second obtaining step, if the output information corresponding to a type determined for a region and the output information corresponding to another type can being transformed into the output information corresponding to the determined type are not stored in the memory, alternative output information for the region is retrieved based on the output information of the region.

4. The method according to claim 3, further comprising the step of storing the retrieved output information in the memory in association with the region.

5. The method according to claim 3, further comprising an acquiring step of acquiring an authority level of a user who instructs output of the registered document, wherein the memory further stores use authority information set for each region, and in the second obtaining step, the plural types of output information are obtained so as to match the use authority information of each region with the authority level of the user, wherein the use authority information indicates whether or not the retrieval of the alternative output information is permitted in accordance with the authority level of the user.

6. The method according to claim 1, wherein information associated with the registered document includes attribute information of each region and layout information.

7. The method according to claim 1, wherein each output information is at least one of a resolution-variable raster image, a vector image, a monochrome image, a color image, a three-dimensional image, text of a character recognition result, font information, and a translation result into another language.

8. The method according to claim 1, wherein the determining step includes a step of determining the types of the output information to be output for the respective regions based on both the information of the output destination and characteristics of the plural types of output information of the respective regions.

9. The method according to claim 1, further comprising an acquiring step of acquiring an authority level of a user who instructs output of the registered document, wherein the memory further stores use authority information set for each region, and in the second obtaining step, the plural types of output information are obtained so as to match the use authority information of each region with the authority level of the user.

10. The method according to claim 9, further comprising:
a setting step of setting the use authority information for each region.

11. The method according to claim 9, wherein the use authority information indicates whether or not the transformation in the second obtaining step is permitted in accordance with the authority level of the user.

12. An image processing apparatus comprising:

a divider, arranged to divide a registered document image into a plurality of regions based on image attributes;

a transformer, arranged to transform an image of each region divided by said divider into plural types of output information, wherein a data format of each type of the output information is expected to be used frequently;

a generator, arranged to generate structured document information which indicates a structure of the registered document image by associating the output information with respective regions;

a storing section, arranged to store the structured document information and the plural types of output information for each region in a memory as a registered document;

a first obtainer, arranged to obtain information of an output destination of the registered document stored in the memory;

a determiner, arranged to determine types of information to be output for respective regions in the registered document, based on both the information of the output destination and the image attributes of the respective regions;

a second obtainer, arranged to obtain a plurality of the output information corresponding to the determined types for the respective regions;

a combiner, arranged to combine the plurality of the output information obtained for the respective regions into a combined document data; and an output unit, arranged to output the combined document data to the output destination, wherein if the output information corresponding to a type determined for a region is stored in the memory, said second obtainer obtains the output information corresponding to the determined type for the region from the memory, wherein if the output information corresponding to a type determined for a region is not stored in the memory, said second obtainer obtains the output information corresponding to another type from the memory, and transforms the obtained output information into the output information corresponding to the determined type for the region.

13. The image processing apparatus according to claim 12, further comprising an acquiring unit arranged to acquire an authority level of a user who instructs output of the registered document, wherein the memory further stores use authority information set for each region, and said second obtainer obtains the plural types of output information so as to match the use authority information of each region with the authority level of the user.

14. A non-transitory computer-readable medium storing a computer-executable program for causing a computer to perform an image processing method, the method comprising the steps of:

dividing a registered document image into a plurality of regions based on image attributes;

transforming an image of each region divided in the dividing step into plural types of output information, wherein a data format of each type of the output information is expected to be used frequently;

generating structured document information which indicates a structure of the registered document image by associating the output information with respective regions;

storing the structured document information and the plural types of output information for each region in a memory as a registered document;

obtaining information of an output destination of the registered document stored in the memory;

determining types of the output information to be output for respective regions in the registered document, based on both the information of the output destination and the image attributes of the respective regions;

obtaining a plurality of the output information corresponding to the determined types for the respective regions;

combining the plurality of the output information obtained for the respective regions into a combined document data; and outputting the combined document data to the output destination, wherein in the second obtaining step, if the output information corresponding to a type determined for a region is stored in the memory, the output information corresponding to the determined type is obtained for the region from the memory, wherein in the second obtaining step, if the output information corresponding to a type determined for a region is not stored in the memory, the output information corresponding to another type is obtained from the memory, and the obtained output information is transformed into the output information corresponding to the determined type for the region.

* * * * *